(12) United States Patent
Wu et al.

(10) Patent No.: US 12,265,739 B2
(45) Date of Patent: Apr. 1, 2025

(54) DATA ACCESS INTERFACE UNIT AND THE METHOD FOR PROCESSING I/O REQUESTS

(71) Applicant: Infortrend Technology, Inc., New Taipei (TW)

(72) Inventors: Yen-Chen Wu, New Taipei (TW); Ying-Wen Lin, New Taipei (TW); Chih-Min Hsiao, New Taipei (TW)

(73) Assignee: Infortrend Technology, Inc., New Taipei (TW)

( * ) Notice: Subject to any disclaimer, the term of this patent is extended or adjusted under 35 U.S.C. 154(b) by 12 days.

(21) Appl. No.: 18/516,966

(22) Filed: Nov. 22, 2023

(65) Prior Publication Data

US 2024/0311050 A1    Sep. 19, 2024

Related U.S. Application Data

(60) Provisional application No. 63/447,869, filed on Feb. 23, 2023.

(51) Int. Cl.
*G06F 3/00* (2006.01)
*G06F 3/06* (2006.01)

(52) U.S. Cl.
CPC .......... *G06F 3/0659* (2013.01); *G06F 3/0604* (2013.01); *G06F 3/0689* (2013.01)

(58) Field of Classification Search
CPC ..... G06F 3/0659; G06F 3/0604; G06F 3/0689
See application file for complete search history.

(56) References Cited

U.S. PATENT DOCUMENTS

| 2005/0005062 | A1* | 1/2005 | Liu | G06F 3/0683 |
| | | | | 711/112 |
| 2018/0232142 | A1* | 8/2018 | Shekar | G06F 11/2046 |

* cited by examiner

*Primary Examiner* — Craig S Goldschmidt
(74) *Attorney, Agent, or Firm* — Winston Hsu

(57) ABSTRACT

The present invention discloses a data access interface unit comprising: a physical storage device controller for receiving a first control signal from a first storage virtualization controller, and accordingly determining the first storage virtualization controller as the primary controller, and generating a first selection signal; a selector for receiving the first selection signal, and accordingly selecting data and signals from the first storage virtualization controller; and a clock generation circuit for providing a dedicated clock signal to the physical storage device, where when the physical storage device controller receives a re-set signal from a second storage virtualization controller, the physical storage device controller determines the second storage virtualization controller as the new primary controller, and accordingly generates a second selection signal so as to control the selector to select data and signals from the second storage virtualization controller.

23 Claims, 10 Drawing Sheets

DATA ACCESS INTERFACE UNIT AND THE METHOD FOR PROCESSING I/O REQUESTS

CROSS REFERENCE TO RELATED APPLICATION

This application claims the benefit of U.S. Provisional Application No. 63/447,869, filed on Feb. 23, 2023. The content of the application is incorporated herein by reference.

BACKGROUND OF THE INVENTION

1. Field of the Invention

The present invention relates to a data access interface unit applied in the field of data storage, and more particularly, to a data access interface unit that facilitates communication between a physical storage device (PSD) and a plurality of controllers.

2. Description of the Related Art

Please refer to FIG. 1A, which is a schematic diagram of a commonly known storage system architecture (1A), referred to as "storage system architecture (1A)" hereinafter. The storage system architecture (1A) comprises a host (15) and a redundant array of independent disks subsystem (3A) (also referred to as "RAID subsystem (3A)"), wherein the RAID subsystem (3A) comprises a controller pair consisting of two controllers (100, 200) and a plurality of solid state disk (SSD) units (301a, 301b).

In order to increase the reliability of data storage systems, it's common to employ redundant architecture, which configures two controllers (for example, a first controller (100) and a second controller (200)) into a controller pair (also known as a "redundant pair"). This setup ensures that when one controller (for example, the first controller (100)) malfunctions or becomes inoperative, the other one (for example, the second controller (200)) will take over the tasks originally handled by the failed controller (such as taking over the data storage devices originally managed by the failed controller), allowing the host to continue performing data access operations on all data storage devices seamlessly. Furthermore, an increasing number of data storage systems nowadays utilize solid state disks (SSDs) as their data storage devices. SSDs may offer either single ports or dual ports for connection to the controllers. However, SSDs equipped with dual ports are not only less common but also significantly more expensive. Consequently, in practical application, the storage industry predominantly favors SSDs with single ports. Thus, to balance system reliability and cost-effectiveness, it is common in data storage systems that configure two controllers and use SSDs with single ports as their data storage devices.

Taking FIG. 1A as an example, the RAID subsystem (3A) includes a first SSD (12) within a first SSD unit (301a) and a second SSD (22) within a second SSD unit (301b), both only equipped with single ports. Consequently, each of the two SSD units (301a, 301b) needs a multiplexer (16, 26), an SSD controller (14, 24), and a clock multiplexer (18, 28) to facilitate the connection of the SSDs (12, 22) to the two controllers (100, 200) and to assist in switching and processing of data and signals from the controllers (100, 200). The first SSD controller (14) and the second SSD controller (24) are responsible for receiving control signals from a primary controller (e.g., the first controller (100) or the second controller (200)) so as to control the multiplexers (16, 26) and the clock multiplexers (18, 28) to receive data and signals from the primary controller, and informing the primary controller of connections and operating statuses of the SSDs (12, 22). The first multiplexer (16) and the second multiplexer (26) routes data and signals along the designated path based on the control signals from the SSD controllers (14, 24). The first clock multiplexer (18) and the second clock multiplexer (28) receive control signals from the SSD controllers (14, 24) and accordingly utilize the clock signals provided by the primary controller. More specifically, the clock signals of the primary controller are provided by its device-side input/output controller (device-side I/O controller), such as the first device-side I/O controller (1007) of the first controller (100) or the second device-side I/O controller (2007) of the second controller (200).

For example, suppose the primary controller is the first controller (100), and the secondary controller is the second controller (200). At system initialization, the primary controller (the first controller (100)) detects notification signals from the first SSD controller (14) of the first SSD unit (301a) and from the second SSD controller (24) of the second SSD unit (301b), so as to inform the primary controller (the first controller (100)) of the connection to the first SSD (12) and the second SSD (22). Subsequently, the primary controller (the first controller 100) issues signals to notify the first SSD controller (14) and the second SSD controller (24), and through the first SSD controller (14) and the second SSD controller (24), controls the first multiplexer (16) and the second multiplexer (26), respectively, in order to establish paths between the primary controller (the first controller (100)) and the first SSD (12) as well as between the primary controller (the first controller (100)) and the second SSD (22). Additionally, the primary controller (the first controller 100) issues signals to notify the first SSD controller (14) and the second SSD controller (24), and through the first SSD controller (14) and the second SSD controller (24), controls the first clock multiplexer (18) and the second clock multiplexer (28) to receive clock signals provided by the primary controller (specifically, by the first device-side I/O controller (1007) of the first controller (100)), enabling the first SSD (12) and the second SSD (22) to operate based on the aforesaid clock signals.

From the above, it can be inferred that when the primary controller, i.e., the first controller (100), fails to operate properly and the backup second controller (200) has not yet completed the takeover operation, the first SSD (12) and the second SSD (22) will inevitably lack clock signals from the two controllers (100, 200) to follow. This will result in the SSDs (12, 22) having to pause their ongoing operations, leading to access latency and impacting system performance. This is the first issue encountered by the conventional storage system architecture (1A).

Please refer to FIG. 1B, which is a schematic diagram illustrating another commonly known storage system architecture (1B), referred to as "storage system architecture (1B)" hereinafter. The storage system architecture (1B) comprises a host (15) and a redundant array of independent disks subsystem (3B), also referred to as "RAID subsystem (3B)". The RAID subsystem (3B) comprises a controller pair, a plurality of SSD units (301) and a plurality of distributors (113, 115, 117, 213, 215, 217). The controller pair comprises a first controller (100) and a second controller (200). The plurality of SSD units (301) comprise a 1st SSD unit (301a), a 2nd SSD unit (301b), a 3rd SSD unit (301c), a 4th SSD unit (301d), a 5th SSD unit (301e), a 6th SSD unit (301f), a 7th SSD unit (301g), an 8th SSD unit (301*h*), a 9th SSD unit (301*i*), a 10th SSD unit (301*j*), an 11th SSD unit (301*k*), a 12th SSD unit (301*l*), a 13th SSD unit (301*m*), a 14th SSD unit (301*n*), a 15th SSD unit (301*o*), a 16th SSD unit (301*p*), a 17th SSD unit (301*q*), an 18th SSD unit (301*r*), a 19th SSD unit (301*s*), a 20th SSD unit (301*t*), a 21st SSD unit (301*u*), a 22nd SSD unit (301*v*), a 23rd SSD unit (301*w*), and a 24th SSD unit (301*x*). The RAID subsystem (3B) depicted in FIG. 1B is similar to the RAID subsystem (3A) depicted in FIG. 1A, with the difference being that the RAID subsystem (3B) comprises more SSD units (301) and additional six distributors (113, 115, 117, 213, 215, 217).

In the architecture of the RAID subsystem (3B) in FIG. 1B, due to the need for the two controllers (100, 200) to connect more SSD units (301) and to provide clock signals to these SSD units (301), it is necessary to use the distributors (113, 115, 117, 213, 215, 217) to assist in routing a plurality of clock signal lines to each of the SSD units (301). Taking FIG. 1B as an example, the first device-side I/O controller (1007) of the first controller (100) routes three clock signal lines to three associated distributors (113, 115, 117), and each of the three distributors (113, 115, 117) routes eight clock signal lines to the corresponding SSD units (301). In this way, a total of twenty-four clock signal lines cover all the SSD units (301*a*-301*x*) as shown in FIG. 1B. More specifically, the distributor (113) routes eight clock signal lines (i.e., clock signal line #1 to clock signal line #8) to the 1st SSD unit (301*a*) to the 8th SSD unit (301*h*); the distributor (115) routes eight clock signal lines (i.e., clock signal line #9 to clock signal line #16) to the 9th SSD unit (301*i*) to the 16th SSD unit (301*p*); and the distributor (117) routes eight clock signal lines (i.e., clock signal line #17 to clock signal line #24) to the 17th SSD unit (301*q*) to the 24th SSD unit (301*x*).

Similarly, in order to provide the clock signals to all SSD units (301*a* to 301*x*), the second device-side I/O controller (2007) of the second controller (200) routes three clock signal lines to three distributors (213, 215, 217), and each of the three distributors (213, 215, 217) routes eight clock signal lines to the corresponding SSD units (301). In this way, a total of twenty-four clock signal lines cover all the SSD units (301*a*-301*x*) as shown in FIG. 1B.

From the above descriptions, it is inferred that in the known architecture of the RAID subsystem (3B) shown in FIG. 1B, when one or more of the plurality of distributors fail to operate properly due to malfunctions, the multiple SSD units (301) relying on the failed distributors for clock signal provision, will fail to receive clock signals from the device-side I/O controllers (1007, 2007) of the controllers (100, 200), resulting in the inability of these SSD units (301) to operate normally. This, in turn, leads to system performance degradation. For example, if the distributor (113) fails to operate normally, causing the first SSD unit (301*a*) to the eighth SSD unit (301*h*) to all fail and malfunction, the performance of the entire storage system architecture (1B) will suffer. This represents the second issue encountered by the conventional storage system architecture (1B).

In addition, in order to provide clock signals from the device-side I/O controllers (1007, 2007) of the two controllers (100, 200) to the plurality of the SSD units (301), expensive and precise distributors capable of synchronously providing signals are required to route multiple clock signal lines to different SSD units (301), which inadvertently increases the overall costs of the conventional storage system. This is the third issue faced by the conventional storage system architecture (1B). Furthermore, the distributors themselves require a certain amount of space for being installed. Therefore, the routing between the distributors and the SSD units (301) must be designed and planned according to routing rules, taking into consideration the crowded space caused by the distributors, in order to avoid signal attenuation and signal interference (e.g., Electromagnetic Interference (EMI)). Consequently, the factors of space occupied by the distributors and the higher costs both significantly increase system costs and implementation difficulty. This is the fourth issue currently faced by the conventional storage system architecture (1B).

In summary, it is evident that addressing the challenge of providing a data access interface with a lower cost, high reliability, and high performance to facilitate the connection between a single-port storage device and the two controllers is an urgent issue in the storage industry.

SUMMARY OF THE INVENTION

In light of the above issues, it is an object of the present invention to provide a data access interface unit (8) coupled to a first storage virtualization controller (SVC 1) (10), a second storage virtualization controller (SVC 2) (20) and a physical storage device (PSD) (9) to assist either the first storage virtualization controller (SVC 1) (10) or the second storage virtualization controller (SVC 2) (20) in accessing the physical storage device (PSD) (9), the data access interface unit (8) comprising: a physical storage device controller (PSD controller) (81) for receiving a first control signal from the first storage virtualization controller (SVC 1) (10) to confirm that the first storage virtualization controller (SVC 1) (10) is a primary controller of the physical storage device (PSD) (9), and generating a first selection signal, wherein when the physical storage device controller (PSD controller) (81) detects the physical storage device (PSD) (9) that is coupled, the physical storage device controller (PSD controller) (81) sends a notification signal to the first storage virtualization controller (SVC 1) (10) which acts as the primary controller to inform the first storage virtualization controller (SVC 1) (10) of availability of the physical storage device (PSD) (9); a selector (83) for receiving the first selection signal to select data and signals from the first storage virtualization controller (SVC 1) (10) according to the first selection signal; and a clock generation circuit (85) for providing a dedicated clock signal to the physical storage device (PSD) (9); wherein when the physical storage device controller (PSD controller) (81) receives a reset signal from the second storage virtualization controller (SVC 2) (20), the physical storage device controller (PSD controller) (81) initiates a data flow switching procedure to change the primary controller of the physical storage device (PSD) (9) from the first storage virtualization controller (SVC 1) (10) to the second storage virtualization controller (SVC) (20), and the data flow switching procedure includes generating a second selection signal to control the selector (83) to select data and signals from the second storage virtualization controller (SVC 2) (20).

According to one embodiment of the present invention, the data access interface unit (8) is installed on a backplane (401), and the data access interface unit (8) is coupled to the first storage virtualization controller (SVC 1) (10), the second storage virtualization controller (SVC 2) (20), and the physical storage device (PSD) (9) via the backplane (401).

According to one embodiment of the present invention, the physical storage device (PSD) (9) processes at least one input/output request (I/O request) from the first storage virtualization controller (SVC 1) (10) or the second storage virtualization controller (SVC 2) (20) based on the dedicated clock signal provided by the clock generation circuit (85).

According to one embodiment of the present invention, if the second storage virtualization controller (SVC 2) (20) does not receive a confirmation signal from the first storage virtualization controller (SVC 1) (10) within a first time interval, the second storage virtualization controller (SVC 2) (20) generates and sends the reset signal to the physical storage device controller (PSD controller) (81) to notify the physical storage device controller (PSD controller) (81) of setting up the second storage virtualization controller (SVC 2) (20) as the primary controller of the physical storage device (PSD) (9), and the physical storage device controller (PSD controller) (81) generates the second selection signal based on the reset signal to control the selector (83) to select data and signals from the second storage virtualization controller (SVC 2) (20).

According to one embodiment of the present invention, if the second storage virtualization controller (SVC 2) (20) does not receive a response signal from the first storage virtualization controller (SVC 1) (10) after sending a query signal to the first storage virtualization controller (SVC 1) (10), the second storage virtualization controller (SVC 2) (20) generates and sends the reset signal to the physical storage device controller (PSD controller) (81) to notify the physical storage device controller (PSD controller) (81) of setting up the second storage virtualization controller (SVC 2) (20) as the primary controller of the physical storage device (PSD) (9), and the physical storage device controller (PSD controller) (81) generates the second selection signal based on the reset signal to control the selector (83) to select data and signals from the second storage virtualization controller (SVC 2) (20).

According to one embodiment of the present invention, when the physical storage device controller (PSD controller) (81) performs the data flow switching procedure, the physical storage device (PSD) (9) continues executing the at least one I/O request from the first storage virtualization controller (SVC 1) (10) based on the dedicated clock signal provided by the clock generation circuit (85).

According to one embodiment of the present invention, when the physical storage device controller (PSD controller) (81) performs the data flow switching procedure, the physical storage device (PSD) (9) temporarily suspends the execution of the at least one I/O request from the first storage virtualization controller (SVC 1) (10).

According to one embodiment of the present invention, the clock generation circuit (85) provides the dedicated clock signal to the physical storage device (PSD) (9) in a one-to-one manner.

According to one embodiment of the present invention, the first storage virtualization controller (SVC 1) (10) and the second storage virtualization controller (SVC 2) (20) do not require additional circuit components to assist in directing their clock signals to the physical storage device (PSD) (9).

In light of the above issues, it is another object of the present invention to provide a data access method implemented to a redundant array of independent disks subsystem (RAID subsystem) (4A, 4B, 4C), where the RAID subsystem (4A, 4B, 4C) comprises a storage virtualization controller pair (SVC pair) (10, 20), a physical storage device (PSD) (9), and a data access interface unit (8) serving as an intermediary between the storage virtualization controller pair (SVC pair) (10, 20) and the physical storage device (PSD) (9), in which the data access interface unit (8) comprises a physical storage device controller (PSD controller) (81), a selector (83), and a clock generation circuit (85), and the storage virtualization controller pair (SVC pair) (10, 20) comprises a first storage virtualization controller (SVC 1) (10) and a second storage virtualization controller (SVC 2) (20), the data access method comprising steps of: coupling the data access interface unit (8) between the storage virtualization controller pair (SVC pair) (10, 20) and the physical storage device (PSD) (9); sending, by the physical storage device controller (PSD controller) (81), a notification signal to the first storage virtualization controller (SVC 1) (10) acting as a primary controller, to notify the first storage virtualization controller (SVC 1) (10) that the physical storage device (PSD) (9) is available for use, after detecting the coupling with the physical storage device (PSD) (9); receiving, by the physical storage device controller (PSD controller) (81), a first control signal from the first storage virtualization controller (SVC 1) (10), generating a first selection signal accordingly, and sending it to the selector (83); receiving, by the selector (83), the first selection signal and, based on the first selection signal, routing data and signals along a path between the first storage virtualization controller (SVC 1) (10) and the physical storage device (PSD) (9), so that the first storage virtualization controller (SVC 1) (10) acts as the primary controller for the physical storage device (PSD) (9); providing, by the clock generation circuit (85), a dedicated clock signal to the physical storage device (PSD) (9); and processing, by the physical storage device (PSD) (9), at least one input/output (I/O) request from the first storage virtualization controller (SVC 1) (10) based on the dedicated clock signal provided by the clock generation circuit (85); wherein when the physical storage device controller (PSD controller) (81) receives a reset signal from the second storage virtualization controller (SVC 2) (20), the physical storage device controller (PSD controller) (81) initiates a data flow switching procedure to change the primary controller of the physical storage device (PSD) (9) from the first storage virtualization controller (SVC 1) (10) to the second storage virtualization controller (SVC 2) (20), and the data flow switching procedure includes generating a second selection signal to control the selector (83) to route data and signals along a path between the second storage virtualization controller (SVC 2) (20) and the physical storage device (PSD) (9).

According to one embodiment of the present invention, the data access interface unit (8) is installed on a backplane (401), and the data access interface unit (8) is coupled to the storage virtualization controller pair (SVC pair) (10, 20) and the physical storage device (PSD) (9) via the backplane (401).

According to one embodiment of the present invention, if the second storage virtualization controller (SVC 2) (20) does not receive a confirmation signal from the first storage virtualization controller (SVC 1) (10) within a first time interval, the second storage virtualization controller (SVC 2) (20) generates and sends the reset signal to the physical storage device controller (PSD controller) (81) to notify the physical storage device controller (PSD controller) (81) of setting up the second storage virtualization controller (SVC 2) (20) as the primary controller of the physical storage device (PSD) (9), and the physical storage device controller (PSD controller) (81) generates the second selection signal based on the reset signal to control the selector (83) to select data and signals from the second storage virtualization controller (SVC 2) (20).

According to one embodiment of the present invention, if the second storage virtualization controller (SVC 2) (20) does not receive a response signal from the first storage virtualization controller (SVC 1) (10) after sending a query signal to the first storage virtualization controller (SVC 1) (10), the second storage virtualization controller (20) generates and sends the reset signal to the physical storage device controller (PSD controller) (81) to notify the physical storage device controller (PSD controller) (81) of setting up the second storage virtualization controller (SVC 2) (20) as the primary controller of the physical storage device (PSD) (9), and the physical storage device controller (PSD controller) (81) generates the second selection signal based on the reset signal to control the selector (83) to select data and signals from the second storage virtualization controller (SVC 2) (20).

According to one embodiment of the present invention, when the physical storage device controller (PSD controller) (81) performs the data flow switching procedure, the physical storage device (PSD) (9) continues executing the at least one I/O request from the first storage virtualization controller (SVC 1) (10) based on the dedicated clock signal provided by the clock generation circuit (85).

According to one embodiment of the present invention, when the physical storage device controller (PSD controller) (81) performs the data flow switching procedure, the physical storage device (PSD) (9) temporarily suspends the execution of the at least one I/O request from the first storage virtualization controller (SVC 1) (10).

According to one embodiment of the present invention, the clock generation circuit (85) provides the dedicated clock signal to the physical storage device (PSD) (9) in a one-to-one manner.

According to one embodiment of the present invention, the first storage virtualization controller (SVC 1) (10) and the second storage virtualization controller (SVC 2) (20) do not require additional circuit components to assist in directing their clock signals to the physical storage device (PSD) (9).

In light of the above issues, it is another object of the present invention to provide a data access method implemented to a redundant array of independent disks subsystem (RAID subsystem) (4A, 4B, 4C), where the RAID subsystem (4A, 4B, 4C) comprises a storage virtualization controller pair (SVC pair) (10, 20), a physical storage device (PSD) (9), and a data access interface unit (8) serving as an intermediary between the storage virtualization controller pair (SVC pair) (10, 20) and the physical storage device (PSD) (9), in which the data access interface unit (8) comprises a physical storage device controller (PSD controller) (81), a selector (83), and a clock generation circuit (85), and the storage virtualization controller pair (SVC pair) (10, 20) comprises a first storage virtualization controller (SVC 1) (10) and a second storage virtualization controller (SVC 2) (20), the data access method comprising steps of: coupling the data access interface unit (8) between the storage virtualization controller pair (SVC pair) (10, 20) and the physical storage device (PSD) (9); setting up the first storage virtualization controller (SVC 1) (10) as a primary controller of the physical storage device (PSD) (9); processing, by the physical storage device (PSD) (9), at least one first input/output (I/O) request from the first storage virtualization controller (SVC 1) (10) based on a dedicated clock signal provided by the clock generation circuit (85); sending, by the second storage virtualization controller (SVC 2) (20), a reset signal to the physical storage device controller (PSD controller) (81) of the data access interface unit (8), to set up the second storage virtualization controller (SVC 2) (20) as the primary controller of the physical storage device (PSD) (9); generating, by the physical storage device controller (PSD controller) (81), a selection signal based on the reset signal and sending the selection signal to the selector (83) to control the selector (83) to route data and signals along a path between the second storage virtualization controller (SVC 2) (20) and the physical storage device (PSD) (9) according to the selection signal; and processing, by the physical storage device (PSD) (9), at least one second input/output (I/O) request from the second storage virtualization controller (SVC 2) (20) based on the dedicated clock signal provided by the clock generation circuit (85); wherein, during a process of switching the primary controller of the physical storage device (PSD) (9) from the first storage virtualization controller (SVC 1) (10) to the second storage virtualization controller (SVC 2) (20), the physical storage device (PSD) (9) processes the at least one first input/output (I/O) request according to the dedicated clock signal provided by the clock generation circuit (85).

According to one embodiment of the present invention, the data access interface unit (8) is installed on a backplane (401), and the data access interface unit (8) is coupled to the storage virtualization controller pair (SVC pair) (10, 20) and the physical storage device (PSD) (9) via the backplane (401).

According to one embodiment of the present invention, the step of sending, by the second storage virtualization controller (SVC 2) (20), the reset signal to the physical storage device controller (PSD controller) (81) of the data access interface unit (8) further comprises: generating and sending the reset signal to the physical storage device controller (PSD controller) (81) by the second storage virtualization controller (SVC 2) (20) when the second storage virtualization controller (SVC 2) (20) does not receive a confirmation signal from the first storage virtualization controller (SVC 1) (10) after a first time interval.

According to one embodiment of the present invention, the step of sending, by the second storage virtualization controller (SVC 2) (20), the reset signal to the physical storage device controller (PSD controller) (81) in the data access interface unit (8) further comprises: generating and sending the reset signal to the physical storage device controller (PSD controller) (81) by the second storage virtualization controller (SVC 2) (20) when the second storage virtualization controller (SVC 2) (20) does not receive a response signal from the first storage virtualization controller (SVC 1) (10) after sending a query signal to the first storage virtualization controller (SVC 1) (10).

According to one embodiment of the present invention, the clock generation circuit (85) provides the dedicated clock signal to the physical storage device (PSD) (9) in a one-to-one manner.

According to one embodiment of the present invention, the first storage virtualization controller (SVC 1) (10) and the second storage virtualization controller (SVC 2) (20) do not require additional circuit components to assist in directing their clock signals to the physical storage device (PSD) (9).

These and other objectives of the present invention will no doubt become obvious to those of ordinary skill in the art after reading the following detailed description of the preferred embodiment that is illustrated in the various figures and drawings.

DETAILED DESCRIPTION

In this specification and the claims thereof, some terms are used to describe some specific components or elements. However, a skilled person in the art generally understands that hardware manufacturers may use different terms to refer to the same components or elements. The specification and the claims thereof do not distinguish the components or elements based on differences in names, but rather on differences in functionality. The term "comprise" or "include" as mentioned in the specification and the claims thereof, is an open term, which should be interpreted as "comprise/include but not limited to". In addition, the term "coupling" herein encompasses any direct and indirect electrical connection means. Therefore, if in the specification, it is described that a first device is coupled to a second device, it means that the first device may be directly electrically connected to the second device or indirectly electrically connected to the second device through other devices or connection means.

Figure 2:
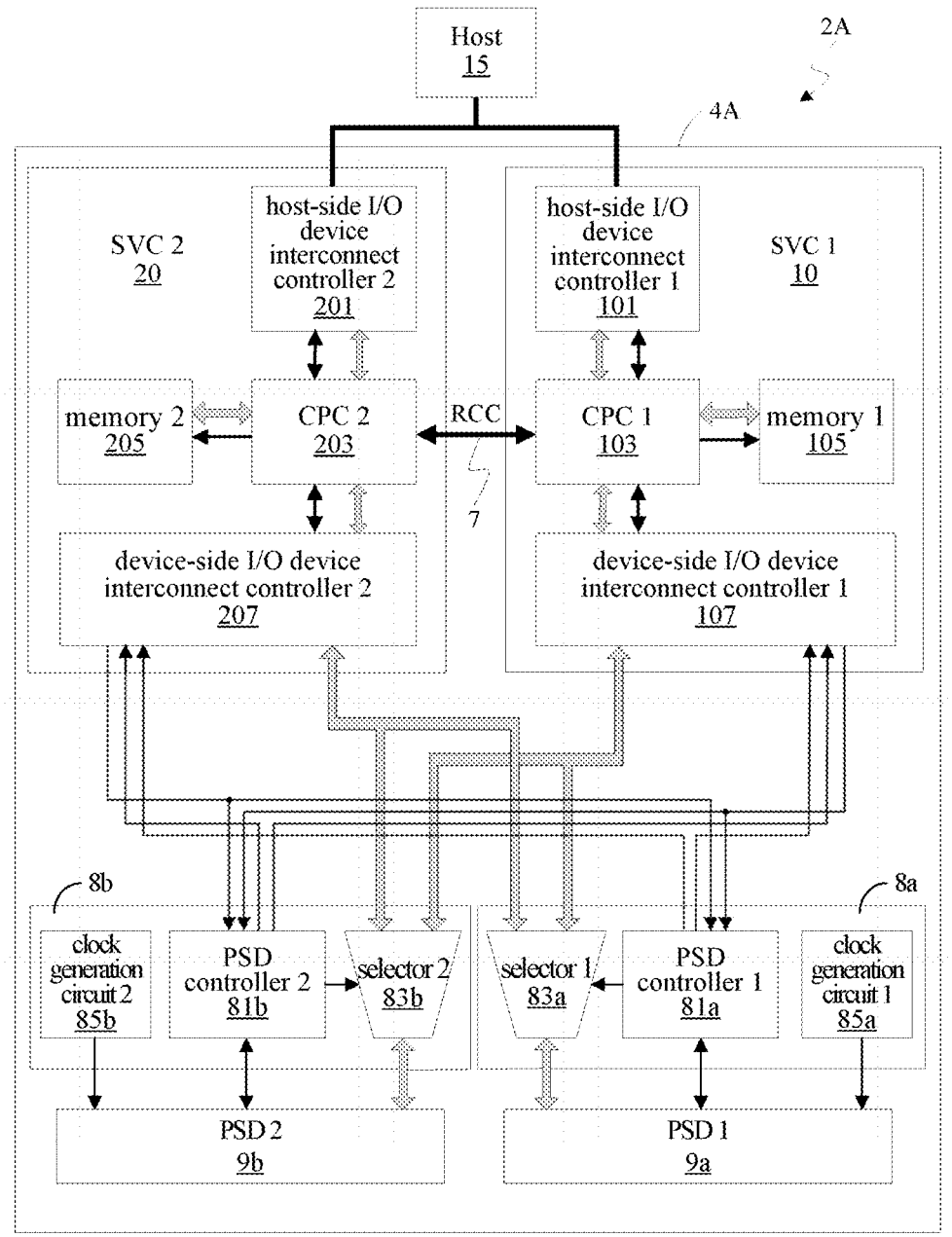
FIG. 2 illustrates a schematic diagram of the storage system architecture (2A) according to the present invention.

Please refer to FIG. 2 illustrating a schematic diagram of a storage system architecture (2A) according to one embodiment of the present invention. The storage system architecture (2A) comprises a host (15) and a redundant array of independent disks (RAID) subsystem (4A), also referred to as "RAID subsystem (4A)". The RAID subsystem (4A) comprises a storage virtualization controller pair (SVC pair) consisting of two storage virtualization controllers (SVCs) (10, 20), a plurality of physical storage devices (PSDs) (9a, 9b), and a plurality of data access interface units (8a, 8b), wherein each of the data access interface units (8a, 8b) is coupled between the two SVCs (10, 20) and one of the PSDs (9a, 9b), serving as an intermediary between the SVC pair (10, 20) and the PSD (9).

In order to increase the reliability of data storage systems, it is common to utilize redundant architectures, in which two SVCs (for example, a first SVC (SVC 1) (10) and a second SVC (SVC 2) (20)) are configured to form an SVC pair. In this configuration, when one SVC (for example, the SVC 1 (10)) of the SVC pair fails or malfunctions, the other SVC (for example, SVC 2 (20)) will take over the work of the failed SVC (for example, taking over the PSDs originally managed by the failed SVC), ensuring uninterrupted access to all PSDs by the host. Therefore, in the RAID subsystem (4A) of the storage system architecture (2A), the SVC 1 (10) and the SVC 2 (20) are configured as the SVC pair in order to back up each other.

In another embodiment of the present invention, the SVC pair consisting of the SVC 1 (10) and the SVC 2 (20) is further coupled to a backplane (not shown in the figure) and interconnected with other components via the backplane. For example, the SVC 1 (10) and the SVC 2 (20) are coupled to the data access interface units (8a, 8b) via the backplane.

There is a redundant controller communicating (RCC) interconnect (7) between the SVC 1 (10) and the SVC 2 (20). Through the RCC interconnect (7), the SVC 1 (10) and the SVC 2 (20) establish an inter-controller communications channel (ICC) between each other in order to exchange data or messages. A common implementation of the ICC is to use a certain communication interconnect such as the Fibre Channel-Arbitrated Loop (FC-AL), the Parallel Small Computer System Interface (Parallel SCSI) operating in a target mode, the Remote Direct Memory Access (RDMA), the Peripheral Component Interconnect Express (PCIe), the Serial Advanced Technology Attachment (SATA) operating in a target mode, or any other communication interconnects which can achieve the similar function of the ICC, but not limited to these options.

The SVC 1 (10) comprises a first host-side I/O device interconnect controller (host-side I/O device interconnect controller 1) (101), a first central processing circuitry (CPC 1) (103), a first memory (memory 1) (105), and a first device-side I/O device interconnect controller (device-side I/O device interconnect controller 1) (107).

The host-side I/O device interconnect controller 1 (101) of the SVC 1 (10) is respectively coupled to the host (15) and the CPC 1 (103) for receiving access requests from the host (15), and converting and/or mapping the access requests to the CPC 1 (103).

The CPC 1 (103) of the SVC 1 (10) is used to process and/or monitor access requests from the host (15).

The memory 1 (105) of the SVC 1 (10) is coupled to the CPC 1 (103), serving as a buffer used to buffer data transmitted between the host (15) and a plurality of PSDs (9a, 9b) through the CPC 1 (103).

The device-side I/O device interconnect controller 1 (107) of the SVC 1 (10) is coupled to the CPC 1 (103) and to the plurality of PSDs (9a, 9b) on the device side. It serves as an interface and a buffer between the plurality of PSDs (9a, 9b) and the CPC 1 (103) for receiving I/O requests and associated data from the CPC 1 (103), and converting and/or mapping the I/O requests and associated data from the CPC 1 (103) to the plurality of PSDs (9a, 9b).

Similarly, the SVC 2 (20) comprises a second host-side I/O device interconnect controller (host-side I/O device interconnect controller 2) (201), a second central processing circuitry (CPC 2) (203), a second memory (memory 2) (205), and a second device-side I/O device interconnect controller (device-side I/O device interconnect controller 2) (207).

The host-side I/O device interconnect controller 2 (201) of the SVC 2 (20) is respectively coupled to the host (15) and the CPC 2 (203) for receiving access requests from the host (15), and converting and/or mapping the access requests to the CPC 2 (203).

The CPC 2 (203) of the SVC 2 (20) is used to process and/or monitor the access requests from the host (15).

The memory 2 (205) of the SVC 2 (20) is coupled to the CPC 2 (203), serving as a buffer used to buffer data transmitted between the host (15) and a plurality of PSDs (9a, 9b) through the CPC 2 (203).

The device-side I/O device interconnect controller 2 (207) of the SVC 2 (20) is coupled to the CPC 2 (203) and to the plurality of PSDs (9a, 9b) on the device side. It serves as an interface and a buffer between the plurality of PSDs (9a, 9b) and the CPC 2 (203) for receiving I/O requests and associated data from the CPC 2 (203), converting and/or mapping the I/O requests and associated data from the CPC 2 (203) to the plurality of PSDs (9a, 9b).

In one embodiment of the present invention, there are a first data access interface unit (data access interface unit 1) (8a) and a second data access interface unit (data access interface unit 2) (8b) in a plurality of data access interface units 8. The data access interface unit 1 (8a) comprises a first physical storage device controller (PSD controller 1) (81a), a first selector (selector 1) (83a), and a first clock generation circuit (clock generation circuit 1) (85a); the data access interface unit 2 (8b) comprises a second physical storage device controller (PSD controller 2) (81b), a second selector (selector 2) (83b), and a second clock generation circuit (clock generation circuit 2) (85b).

The PSD controller 1 (81a) is used to receive control signals from the primary controller (for example, the SVC 1 (10) or the SVC 2 (20)) in order to control the selector 1 (83a) to select data and signals from the primary controller. In addition, the PSD controller 1 (81a) is also used to inform the primary controller of the connection and operating status of the PSD 1 (9a). Similarly, the PSD controller 2 (81b) is used to receive control signals from the primary controller (for example, the SVC 1 (10) or SVC 2 (20)) in order to control the selector 2 (83b) to select data and signals from the primary controller. In addition, the PSD controller 2 (81b) is also used to inform the primary controller of the connection and operating status of the PSD 2 (9b).

The selector 1 (83a) is used to receive a control signal from the PSD controller 1 (81a) and according to the control signal, route data and signals on the specified path. Similarly, the selector 2 (83b) is used to receive a control signal from the PSD controller 2 (81b) and according to the control signal, route data and signals on the specified path. According to one embodiment of the present invention, the selector 1 (83a) and the selector 2 (83b) may be multiplexers or any switch circuits that comply with various protocols in practical applications, such as PCI-E switches, or any other circuit modules or devices that can provide the same function.

The clock generation circuit 1 (85a) is a dedicated clock generation circuit for the PSD 1 (9a), which independently provides a first clock signal to the PSD 1 (9a), enabling the PSD 1 (9a) to operate normally according to the first clock signal. Similarly, the clock generation circuit 2 (85b) is a dedicated clock generation circuit for the PSD 2 (9b), which independently provides a second clock signal to the PSD 2 (9b), enabling the PSD 2 (9b) to operate normally according to the second clock signal. In other words, the clock generation circuit 1 (85a) and the clock generation circuit 2 (85b) are independently-operating components that are not controlled by the SVCs (10, 20) or the PSD controllers (81a, 81b). According to one embodiment of the present invention, the clock generation circuit 1 (85a) and the clock generation circuit 2 (85b) in practical applications may be oscillators, clock signal generators, crystal circuits, or any other circuit modules or devices that can provide the same function.

According to one embodiment of the present invention, the PSD controller 1 (81a), the selector 1 (83a), and the clock generation circuit 1 (85a) in the data access interface unit 1 (8a) are each separate and independent circuit modules that are coupled to the PSD 1 (9a) of the plurality of PSDs (9); the PSD controller 2 (81b), the selector 2 (83b), and the clock generation circuit 2 (85b) in the data access interface unit 2 (8b) are each separate and independent circuit modules that are coupled to the PSD 2 (9b) of the plurality of PSDs (9).

According to another embodiment of the present invention, the PSD controller 1 (81a), the selector 1 (83a), and the clock generation circuit 1 (85a) in the data access interface unit 1 (8a) are integrated into the same chip or circuit, and are coupled to the PSD 1 (9a) of the plurality of PSDs (9); the PSD controller 2 (81b), the selector 2 (83b), and the clock generation circuit 2 (85b) in the data access interface unit 2 (8b) are integrated into the same chip or circuit, and are coupled to the PSD 2 (9b) of the plurality of PSDs (9).

For example, assuming the primary controller is the SVC 1 (10), and the secondary controller is the SVC 2 (20). In operation, the primary controller (i.e., the SVC 1 (10)) receives notification signals from the PSD controllers (81a, 81b), allowing the primary controller to confirm its coupling with which of the PSDs (9) (i.e., PSD 1 (9a) and PSD 2 (9b)). As to the method of determining which one of the two SVCs (10, 20) serves as the primary controller and which one serves as the secondary controller, the detailed explanations will be provided in the description of FIG. 4 below.

According to the present invention, when the PSDs (9a, 9b) are installed in the RAID subsystem (4A), the clock generation circuit 1 (85a) provides a dedicated first clock signal to the PSD 1 (9a), and the clock generation circuit 2 (85b) provides a dedicated second clock signal to the PSD 2 (9b). As a result, the PSD 1 (9a) and the PSD 2 (9b) can operate normally based on the first clock signal and the second clock signal, respectively. Subsequently, the primary controller (specifically, the device-side I/O device interconnect controller 1 (107) of the SVC 1 (10)) issues a set-up signal to the PSD controllers (81a, 81b). Based on the set-up signal, the primary controller (i.e., the SVC 1 (10)) controls the respective selectors (83a, 83b) through the PSD controllers (81a, 81b) to establish communication paths between the PSDs (9a, 9b) and the primary controller (i.e., the SVC 1 (10)).

Please note that, according to the present invention, because the PSDs (9a, 9b) are respectively equipped with the dedicated and independently-operating clock generation circuits (85a, 85b), the PSDs (9a, 9b) do not rely on the SVCs (10, 20) to provide the required clock signals for operation. Even if the primary controller (SVC 1 (10)) fails to provide services, the PSDs (9a, 9b) remain to operate normally based on the dedicated clock signals respectively provided by their dedicated clock generation circuits (85a, 85b), thus preserving system performance without causing delay.

Figure 3A:
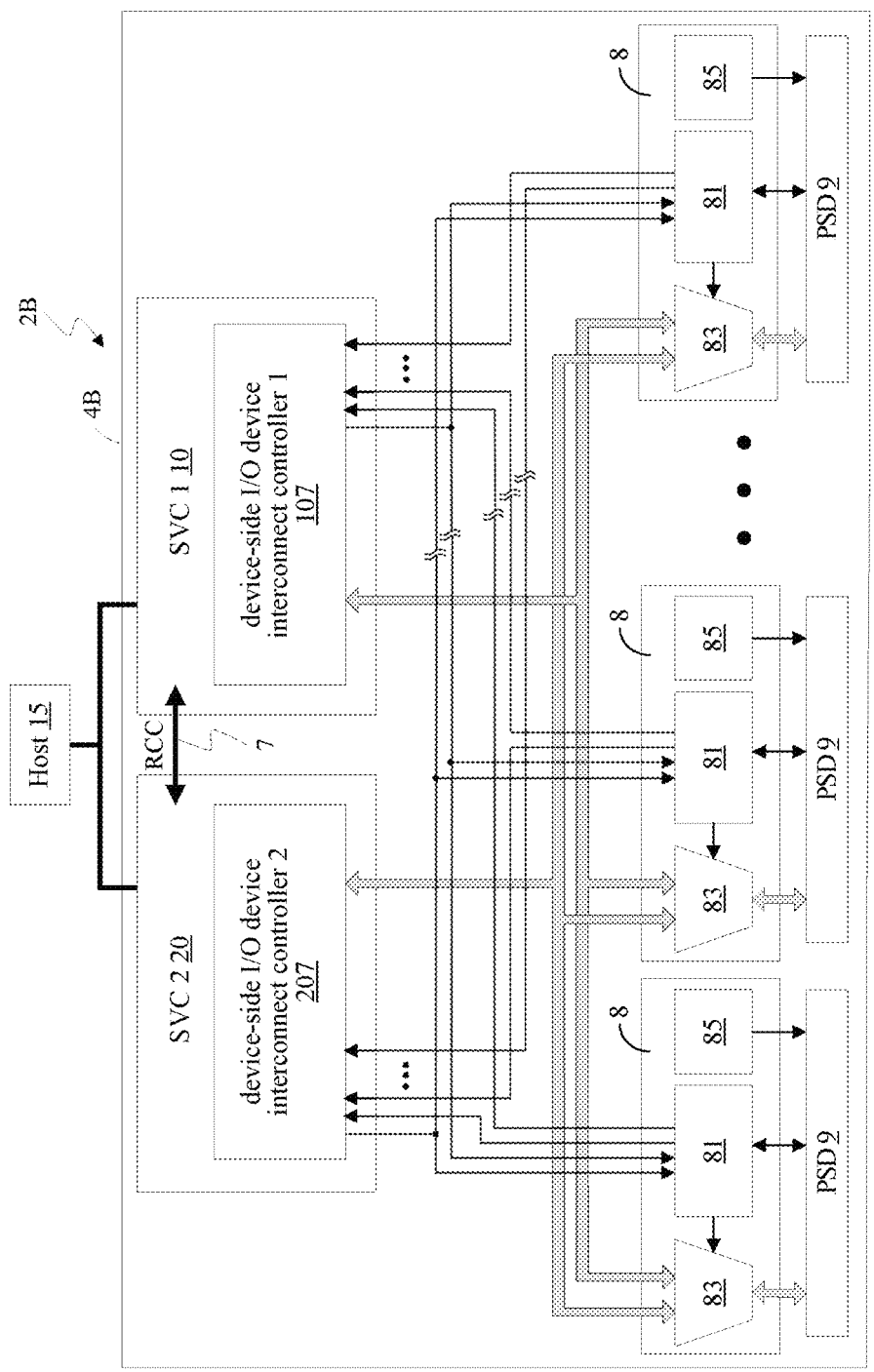
FIG. 3A illustrates a schematic diagram of the storage system architecture (2B) according to the present invention.

Please refer to FIG. 3A, which illustrates a schematic diagram illustrating a storage system architecture (2B) according to one embodiment of the present invention. The storage system architecture (2B) comprises a host (15) and a redundant array of independent disks subsystem (4B), also referred to as "RAID subsystem (4B)". The RAID subsystem (4B) comprises a storage virtualization controller pair (SVC pair) consisting of a first storage virtualization controller (SVC 1) (10) and a second storage virtualization controller (SVC 2) (20), twenty-four physical storage devices (PSDs) (9), and twenty-four data access interface units (8), where each of the data access interface units (8) is coupled between the two SVCs (10, 20) and one of the PSDs (9), serving as an intermediary between the SVC pair (10, 20) and the PSD (9). In another embodiment of the present invention, the SVC pair consisting of the SVC 1 (10) and SVC 2 (20) is further coupled to a backplane (not shown in the figure) and interconnected with other components via the backplane. For example, the SVCs (SVC 1 (10) and SVC 2 (20)) are coupled to the data access interface units (8) via the backplane.

Since the architecture and functionality of the SVC 1 (10) and SVC 2 (20) contained within the RAID subsystem (4B) are substantially the same as those of the SVC 1 (10) and SVC 2 (20) contained within the RAID subsystem (4A) of FIG. 2 as described above, the relevant details of the SVC 1 (10) and SVC 2 (20) contained within the RAID subsystem (4B) illustrated in FIG. 3A will not be further repeated here.

Compared with the RAID subsystem (4A) in FIG. 2, the RAID subsystem (4B) in FIG. 3A is connected to a greater number of PSDs (9), thus requiring more data access interface units (8) to assist in coupling the PSDs (9) with the two SVCs (10, 20). Taking the RAID subsystem (4B) in FIG. 3A as an example, because there are twenty-four PSDs (9), the RAID subsystem (4B) needs twenty-four data access interface units (8) to pair with them. Each of the data access interface units (8) comprises a physical storage device controller (PSD controller) (81), a selector (83), and a clock generation circuit (85), in which the PSD controller (81) corresponds to the PSD controllers (81a, 81b) in FIG. 2, the selector (83) corresponds to the selectors (83a, 83b) in FIG. 2, and the clock generation circuit (85) corresponds to the clock generation circuits (85a, 85b) in FIG. 2. In other words, the detailed explanations regarding the components within the data access interface unit (8), including the PSD controller (81), the selector (83), and the clock generation circuit (85), have been described in aforesaid paragraphs, and thus, will not be reiterated here.

According to one embodiment of the present invention, these PSDs (9) may be hard disk drives (HDDs), solid state drives (SSDs) or other physical storage devices capable of achieving the same functionality.

According to one embodiment of the present invention, one or more of the plurality of data access interface units (8) in the RAID subsystem (4B) have their respective components, comprising the PSD controller (81), the selector (83), and the clock generation circuit (85), fully or partially contained on separate circuit carriers. According to one embodiment of the present invention, these circuit carriers are printed circuit boards (PCBs), backplanes, multiplexer boards (MUX boards) or other circuit modules or devices capable of achieving the same functionality. According to the embodiment in FIG. 3A, each of the data access interface units (8) is implemented by an independent multiplexer board (MUX board); in other words, the foresaid MUX board comprises all the components required to form the data access interface unit (8) (at least, comprising the PSD controller (81), the selector (83) and the clock generation circuit (85)).

According to one embodiment of the present invention, the plurality of data access interface units (8) in the RAID subsystem (4B) have their respective components, including the PSD controller (81), the selector (83) and the clock generation circuit (85), fully or partially integrated into one or more chips and mounted on an independent circuit carrier (not shown), such as a printed circuit board (PCB), a backplane, a multiplexer board (MUX board) or other circuit module or device capable of achieving the same functionality. Please refer to FIG. 3B, where all data access interface units (8) in the RAID subsystem (4C) are integrated onto a backplane (401); in other words, the backplane (401) comprises all the components required to form the plurality of data access interface units (8) (at least, comprising the PSD controllers (81), the selectors (83) and the clock generation circuits (85)).

According to one embodiment of the present invention, it is assumed that the primary controller is the SVC 1 (10), while the secondary controller is the SVC 2 (20). During operation, the primary controller (i.e., SVC 1 (10)) receives notification signals from the PSD controllers (81) in the data access interface units (8), thus identifying which ones of the PSDs (9) are coupled to the primary controller (i.e., SVC 1 (10)). When these PSDs (9) are installed in the RAID subsystem (4B), each of the clock generation circuits (85) in the data access interface units (8), to which the PSDs (9) are respectively coupled, provides a dedicated clock signal to the associated PSD (9). This allows each of the PSDs (9) to operate normally based on its dedicated clock signal. Then, the primary controller (i.e., SVC 1 (10)) (specifically, the device-side I/O device interconnect controller 1 (107) of the SVC 1 (10)) issues a control signal to the PSD controller (81) in each data access interface unit (8), allowing the primary controller (i.e., SVC 1 (10)) to control the corresponding selector (83) through the PSD controller (81) in the data access interface unit (8). This enables the corresponding selector (83) to establish a communication path between the PSD (9) and the primary controller (i.e., SVC 1 (10)).

In one embodiment of the present invention, upon receiving the control signal from the SVC 1 (10), the PSD controllers (81) accordingly generates a selection signal and send it to the corresponding selector (83), enabling the selector (83) to select data and signals from the SVC 1 (10) based on the selection signal.

Please note that, the clock generation circuits (85) of the data access interface units (8) disclosed in the present invention operate respectively as independent circuit components. Therefore, even if the primary controller fails to provide service due to a malfunction, the PSDs (9) can still receive their dedicated clock signals respectively from the clock generation circuits (85). As a result, the PSDs (9) can continue operating without being affected, thereby maintaining system performance and avoiding latency. This resolves the first issue in the prior art where the PSDs (9) have to pause ongoing operations due to the absence of the clock signals during the transition period when the primary controller fails and the other controller has not yet completed the takeover operation.

Figure 1A:
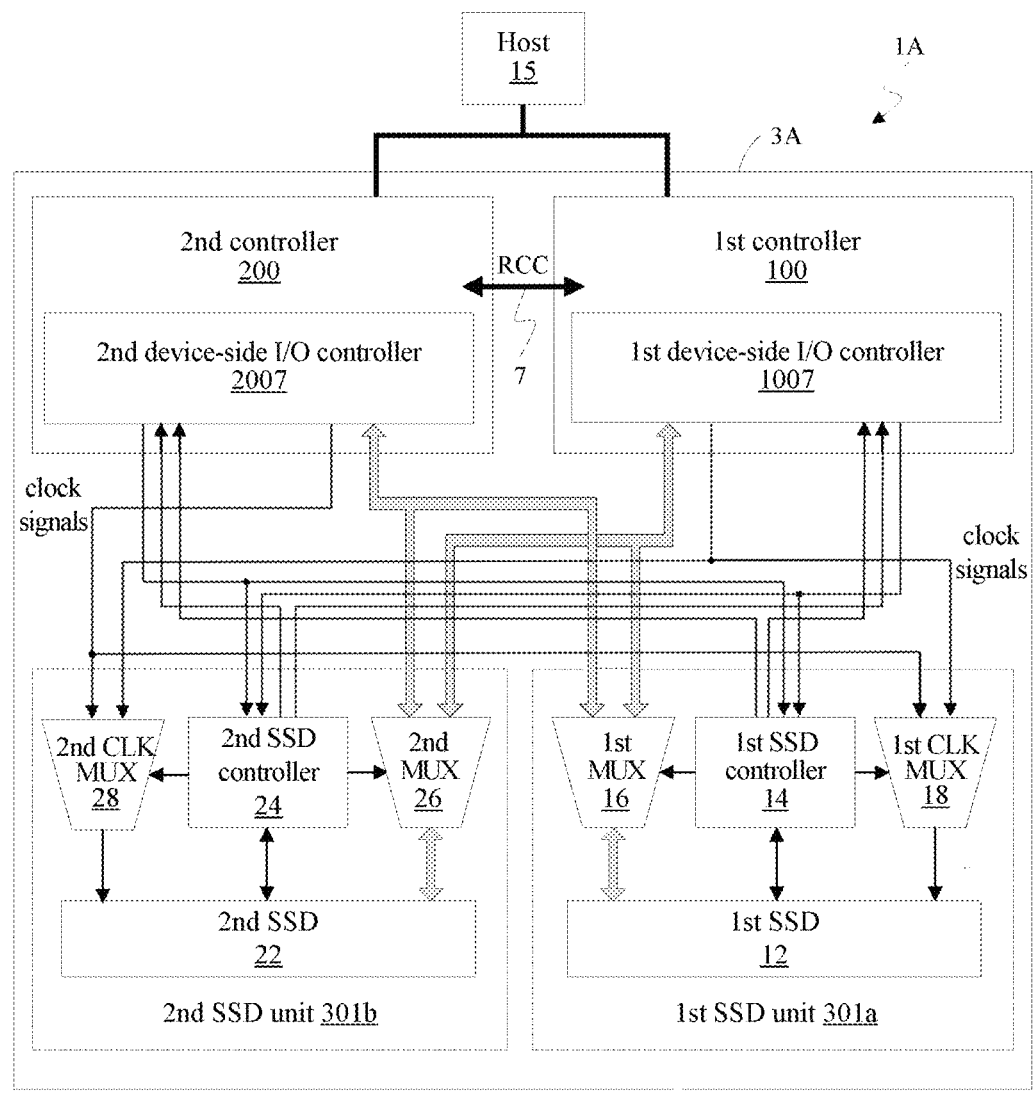
FIG. 1A illustrates a schematic diagram of a conventional storage system architecture (1A).
Figure 1B:
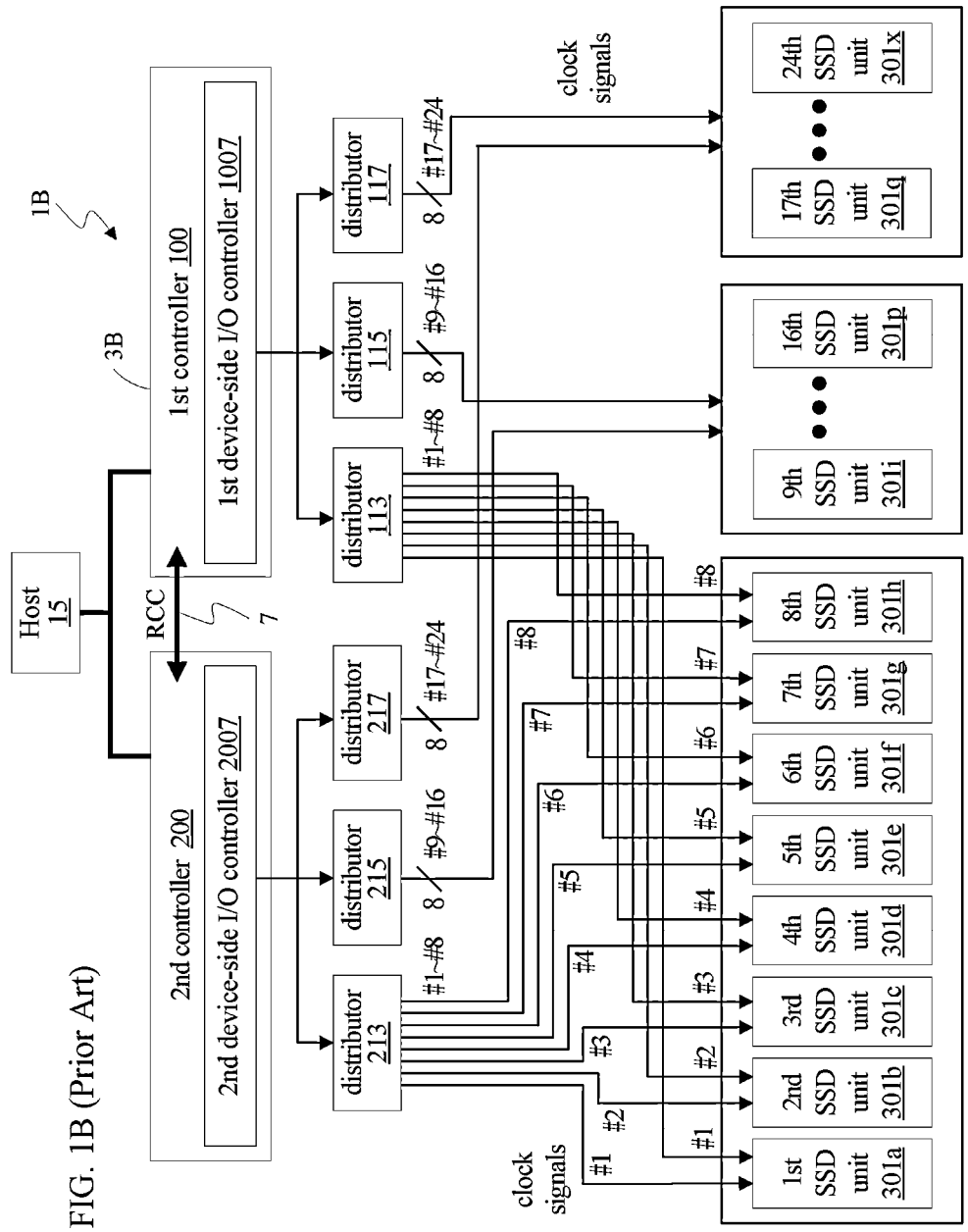
FIG. 1B illustrates a schematic diagram of another conventional storage system architecture (1B).

Furthermore, in the present invention, each one of the PSDs (9) is coupled to one of the data access interface units (8), where the clock generation circuits (85) directly provide dedicated clock signals to the associated PSDs (9). Therefore, when numerous PSDs (9) are installed in the storage system architecture (2B), there is no longer a need for additional circuit components, such as the distributors (113, 115, 117) shown in FIG. 1B, to assist in routing clock signals to these PSDs (9) for the SVCs (10, 20). This resolves the second issue in the prior art, where the failure of a distributor causes multiple connected PSDs (9) to be unable to operate normally, resulting in degrading system performance.

Moreover, since the storage system architecture (2B) does not require the additional circuit components (e.g., distributors 113, 115, 117, 213, 215, 217), it reduces component costs, thus avoiding the third issue of increased costs in the prior art. Furthermore, because the storage system architecture (2B) does not require the additional circuit components (e.g., distributors 113, 115, 117, 213, 215, 217), the circuitry is simpler, eliminating the need for complex routing. This resolves the fourth issue of complex routing in the prior art.

Please refer to FIG. 3B, which illustrates a schematic diagram of a storage system architecture (2C), hereinafter referred to as "storage system architecture (2C)", according to one embodiment of the present invention. The storage system architecture (2C) comprises a host (15) and a redundant array of independent disks subsystem (4C), also referred to as "RAID subsystem (4C)". The RAID subsystem (4C) comprises a storage virtualization controller pair (SVC pair) consisting of a first storage virtualization controller (SVC 1) (10) and a second storage virtualization controller (SVC 2) (20), twenty-four physical storage devices (PSDs) (9), and twenty-four data access interface units (8), in which the data access interface units (8) are coupled between the two SVCs (10, 20) and the PSDs (9). In another embodiment of the present invention, the SVC pair consisting of the SVC 1 (10) and the SVC 2 (20) is further coupled to a backplane (401) and interconnected with other components via the backplane. For example, the SVCs (SVC 1 (10) and SVC 2 (20)) are coupled to the data access interface units (8) via the backplane.

Figure 3B:
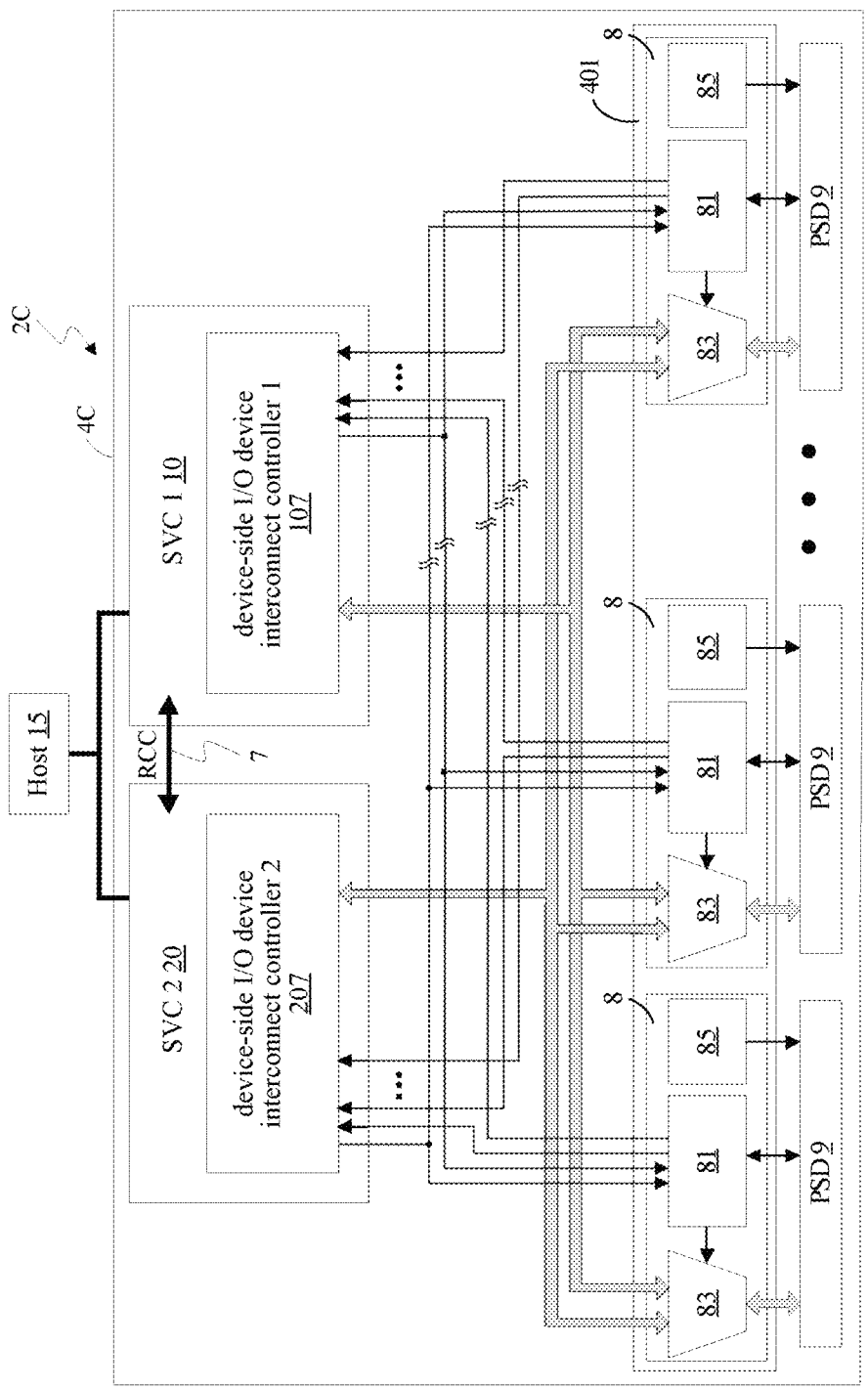
FIG. 3B illustrates a schematic diagram of the storage system architecture (2C) according to the present invention.

Since all the components and the interconnection relationships within the RAID subsystem (4C) depicted in FIG. 3B are the same as those in the RAID subsystem (4B) shown in FIG. 3A, please refer to the previous explanation regarding the RAID subsystem (4B) to understand the functions and interconnection relationships of the components in the RAID subsystem (4C). Further elaboration is omitted here.

Similarly, since the storage system architecture (2C) of the present invention does not require the additional circuit components (e.g., distributors 113, 115, 117, 213, 215, 217), it reduces component costs, thus avoiding the third issue of increased costs in the prior art. Moreover, because the storage system architecture (2C) does not require the additional circuit components (e.g., distributors 113, 115, 117, 213, 215, 217), its circuitry is simpler, eliminating the need for complex routing, thereby resolving the fourth issue of complex routing in the prior art.

Compared with the RAID subsystem (4B) in FIG. 3A, the difference in the RAID subsystem (4C) in FIG. 3B lies in the fact that the twenty-four data access interface units (8) in the RAID subsystem (4C) are integrated on the same backplane (401). In other words, the backplane (401) comprises all the components necessary to form the twenty-four data access interface units (at least comprising the PSD controllers (81), the selectors (83), and the clock generation circuits (85)).

According to one embodiment of the present invention, the plurality of data access interface units (8) in the RAID subsystems (4B, 4C) are divided into two groups. In the first group, one or more data access interface units (8) are individually presented on separate circuit carriers. For example, each of the data access interface units (8) is implemented on an independent multiplexer board (MUX board), which comprises all the components necessary to form a data access interface unit (8) (at least comprising the PSD controller (81), the selector (83) and the clock generation circuit (85)). On the other hand, in the second group, multiple data access interface units (8) are integrated into one or more chips and installed on the same circuit carrier. For example, the multiple data access interface units (8) in the second group are all integrated on a backplane (401), which comprises all the components necessary to form the multiple data access interface units (8) in the second group (at least comprising the PSD controllers (81), the selectors (83), and the clock generation circuits (85)).

According to one embodiment of the present invention, the SVC pair consisting of the SVC 1 (10) and the SVC 2 (20) is further coupled to the backplane (401), and via the plurality of data access interface units (8) integrated on the backplane (401), coupled to the plurality of PSDs (9).

Figure 4:
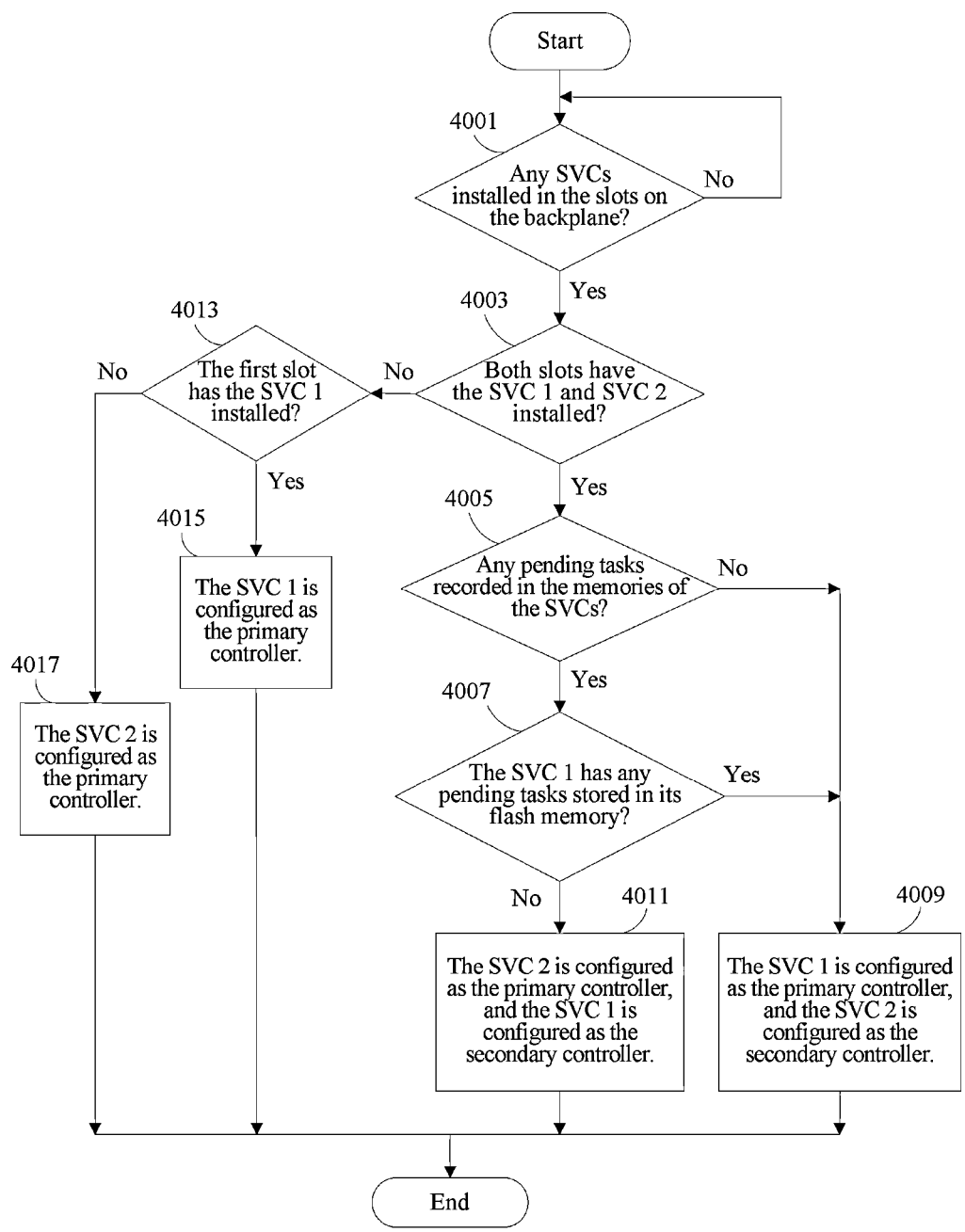
FIG. 4 illustrates a flowchart which sets forth the process of configuring an SVC as the primary controller according to one embodiment of the present invention.

Please refer to FIG. 4 which illustrates a flowchart depicting the setup process of the primary controller according to one embodiment of the present invention. The following explanation takes the storage system architecture (2A) as an example, but the technical content is equally applicable to other storage system architectures (2B, 2C) in the present invention. According to one embodiment of the present invention, the storage system architecture (2A) comprises a backplane (not shown), which comprises a first slot and a second slot for installing the SVC 1 (10) and the SVC 2 (20), and assisting the SVCs (10, 20) in electrical connections with other components connected to the backplane. When the RAID subsystem (4A) is established, the SVCs (10, 20) are first inserted into the slots on the backplane. After all components are in place and connected, the RAID subsystem (4A) is then activated to configure the primary controller. At this point, the RAID subsystem (4A) determines whether there are any SVCs installed in the slots (the first slot and the second slot) on the backplane (step 4001). If the determination result is "No" in step 4001, indicating that no SVC is inserted into any of the slots on the backplane, then the RAID subsystem (4A) remains in step 4001. If the determination result is "Yes" in step 4001, indicating that at least one SVC is inserted into one of the slots on the backplane, the process flow proceeds to step 4003 for configuring the primary controller.

If the determination result is "Yes" in step 4001, then the RAID subsystem (4A) further determines whether both slots (the first slot and the second slot) have the SVCs (10, 20) installed (step 4003). If the determination result is "Yes" in step 4003, indicating that both the first slot and the second slot have the SVCs (10, 20) installed, then the process proceeds to step 4005 to make further determinations to assist in deciding which SVC, either the SVC 1 (10) or the SVC 2 (20), should serve as the primary controller. Conversely, if the determination result is "No" in step 4003, indicating that only one of the slots has an SVC installed, then the process proceeds to step 4013 to determine which one of the slots has an SVC installed, and the installed SVC, either the SVC 1 (10) or the SVC 2 (20), will be configured as the primary controller.

If the determination result is "Yes" in step 4003, then the process proceeds to step 4005, where the two SVCs (10, 20) determine whether there are any pending tasks recorded in their respective flash memories (step 4005). If the determination result is "No" in step 4005, indicating that both the SVCs (10, 20) have no pending tasks recorded in their respective flash memories, then according to the default settings, the RAID subsystem (4A) configures the SVC installed in the first slot (i.e., SVC 1 (10)) as the primary controller, and configures the SVC installed in the second slot (i.e., SVC 2 (20)) as the secondary controller (step 4009). On the contrary, if the determination result is "Yes" in step 4005, indicating that at least one of the SVCs (10, 20) has pending tasks recorded in its flash memory, then the process proceeds to step 4007 for further determination.

In step 4007 further determination is made to determine whether the SVC 1 (10) installed in the first slot has any pending tasks stored in its flash memory. If the determination result is "Yes" in step 4007, then the SVC 1 (10) installed in the first slot is configured as the primary controller, while the SVC 2 (20) installed in the second slot is configured as the secondary controller (step 4009). If the determination result is "No" in step 4007, it indicates that the flash memory with pending tasks is associated with the SVC 2 (20). In this case, the SVC 2 (20) installed in the second slot is configured as the primary controller, while the SVC 1 (10) installed in the first slot is configured as the secondary controller (step 4011).

Let's look back at another determination result made from step 4003. If in step 4003, the determination result is "No", then the process proceeds to step 4013, where the RAID subsystem (4A) further determines whether the first slot has the SVC 1 (10) installed (step 4013). If the determination result is "Yes" in step 4013, indicating that only the SVC 1 (10) is installed in the first slot, then the SVC 1 (10) naturally assumes the role of the primary controller (step 4015). On the contrary, if the determination result is "No" in step 4013, indicating that only the SVC 2 (20) is installed in the second slot, while the first slot has no SVC installed, then the SVC 2 (20) installed in the second slot is configured as the primary controller (step 4017).

Figure 5:
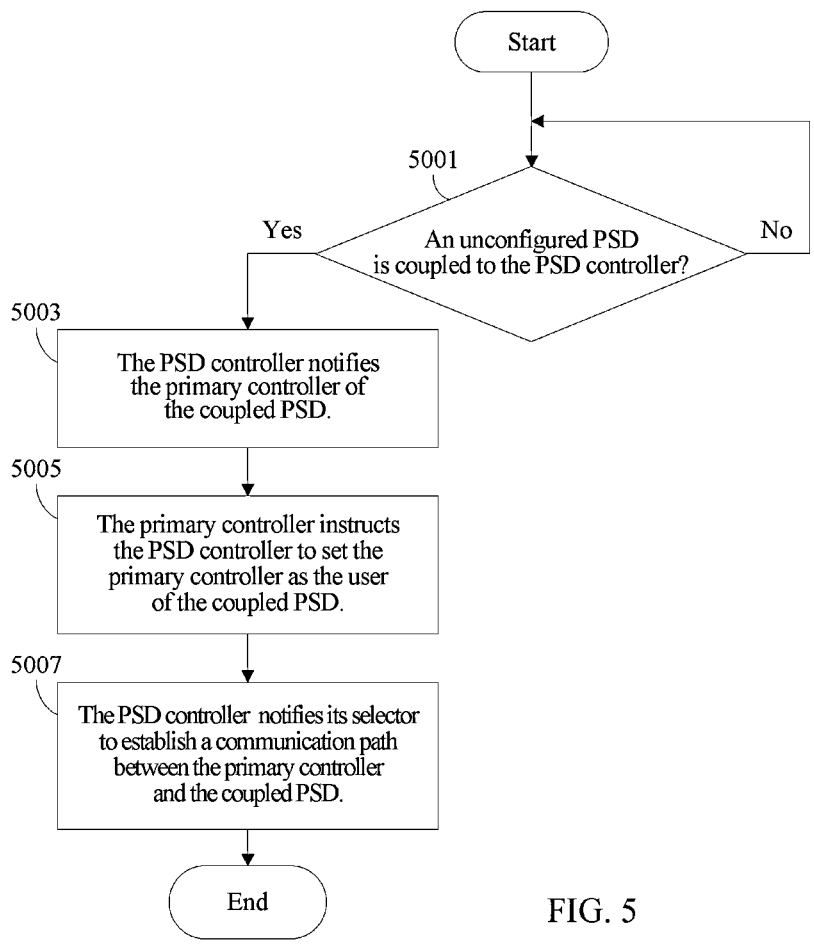
FIG. 5 illustrates a flowchart which sets forth the process of configuring a physical storage device (PSD) to be managed by the primary controller according to one embodiment of the present invention.

Please refer to FIG. 5 which illustrates a flowchart of configuring a PSD according to one embodiment of the present invention. The following explanation takes the RAID subsystem (4B) of the storage system architecture (2B) in FIG. 3A as an example, assuming that the SVC 1 (10) is the primary controller. Similarly, the technical content illustrated in FIG. 5 is also applicable to the storage system architectures (2A) and (2C) of the present invention. According to one embodiment of the present invention, in the RAID subsystem (4B), the PSD controller (81) is responsible for detecting whether it is coupled to an unconfigured PSD (9) (step 5001).

If the determination result is "No" in step 5001, indicating that the PSD controller (81) does not detect any unconfigured PSD (9), then the PSD controller (81) of the RAID subsystem (4B) continues to execute the aforesaid operation of step 5001 to ensure that each connected PSD (9) is configured with a user (SVC) (step 5001).

If the determination result is "Yes" in step 5001, it indicates that the PSD controller (81) in the RAID subsystem (4B) has detected an unconfigured PSD (9) (for example, the PSD 1 (9a) in FIG. 2) that has not yet been assigned to any SVC. According to the descriptions regarding FIG. 4, the PSD controller (81) knows that the primary controller for its corresponding PSD (9) is the SVC 1 (10). Therefore, the PSD controller (81) notifies the primary controller (i.e., the SVC 1 (10)) so that the primary controller (i.e., the SVC 1 (10)) is aware of the presence of the newly coupled PSD (9) (step 5003).

Upon receiving the notification signal from the PSD controller (81), the primary controller (i.e., the SVC 1 (10)) issues a signal through its device-side I/O device interconnect controller 1 (107) to instruct the PSD controller (81) to set itself (i.e., the SVC 1 (10)) as the user of the newly coupled PSD (9) (step 5005).

Upon receiving the signal from the device-side I/O device interconnect controller 1 (107), the PSD controller (81) follows the request of the SVC 1 (10) and notifies its coupled selector (83) of establishing a communication path between the primary controller (i.e., SVC 1 (10)) and the newly coupled PSD (9) as the data flow path (step 5007). Therefore, the process of setting the primary controller for the PSD (9) is completed.

Figure 6:
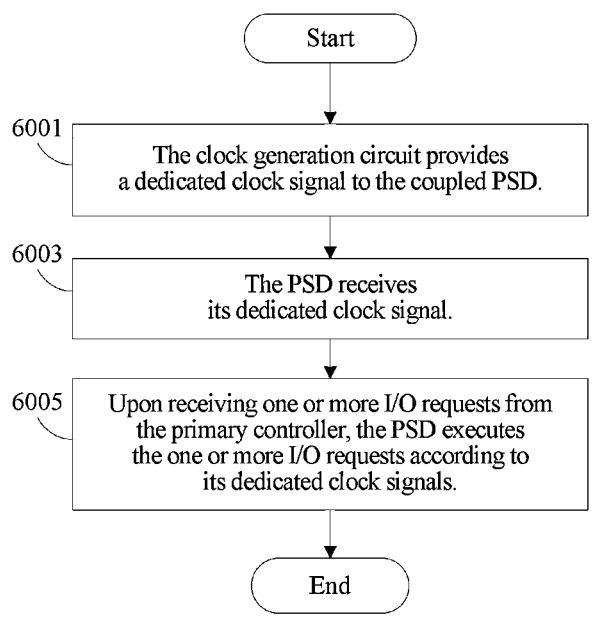
FIG. 6 illustrates a flowchart which sets forth the operation process of the PSDs when the primary controller is under a normal operation mode according to one embodiment of the present invention.

Please refer to FIG. 6 illustrating the operation process of the PSDs (9) according to one embodiment of the present invention when the primary controller is in a normal operation mode. The following explanation takes the RAID subsystem (4A) of the storage system architecture (2A) in FIG. 2 as an example, assuming that the SVC 1 (10) serves as the primary controller. Similarly, the technical content illustrated in FIG. 6 is also applicable to the storage system architectures (2B) and (2C) of the present invention. According to one embodiment of the present invention, the PSD (9) (for example, the PSD 1 (9a)) is coupled to the SVC pair of the RAID subsystem (4A) via a data access interface unit (8) (e.g., the data access interface unit 1 (8a)), where the SVC pair comprises the SVC 1 (10) (i.e., the primary controller) and the SVC 2 (20) (i.e., the secondary controller). In this example, after the data access interface unit 1 (8a) is coupled to the PSD 1 (9a), the clock generation circuit 1 (83a) of the data access interface unit 1 (8a) provides a dedicated first clock signal to the PSD 1 (9a) (step 6001). The PSD 1 (9a) receives this dedicated first clock signal (step 6003). Upon receiving one or more I/O requests from the primary controller (i.e., SVC 1 (10)), the PSD 1 (9a) executes the one or more I/O requests according to its dedicated first clock signal (step 6005).

Figure 7A:
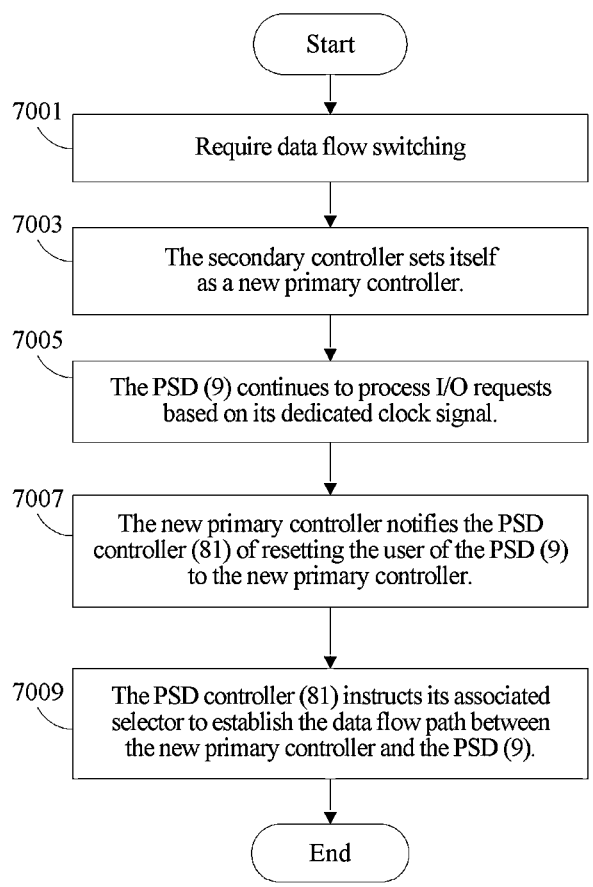
FIG. 7A illustrates a flowchart which sets forth the process of switching the user of the PSDs to a new primary controller when the original primary controller malfunctions according to one embodiment of the present invention.
Figure 7B:
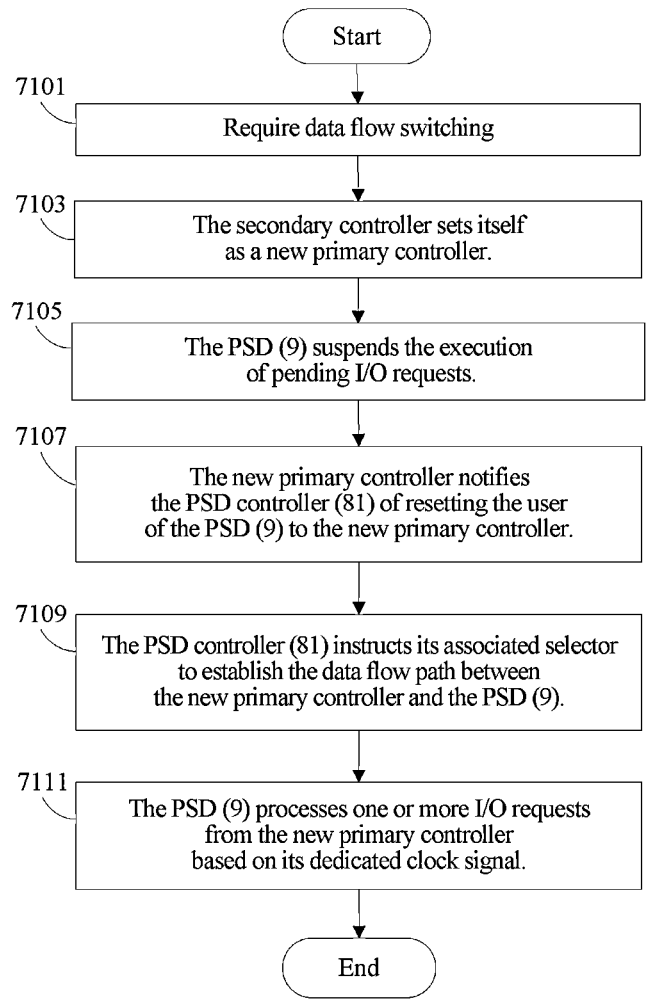
FIG. 7B illustrates another flowchart which sets forth the process of switching the user of the PSDs to a new primary controller when the original primary controller malfunctions according to another embodiment of the present invention.

Please refer to FIG. 7A and FIG. 7B for the description below. FIG. 7A and FIG. 7B illustrate data flow switching procedures according to various embodiments of the present invention for switching the user of the PSD (9) to a new primary controller when data flow switching is necessary. According to one embodiment of the present invention, the reason for needing to perform data flow switching may arise because the primary controller is not functioning properly. According to another embodiment of the present invention, another reason for needing to perform data flow switching is that the user of the PSD (9) is switched to another controller even when the two SVCs (10, 20) are functioning normally. The flowcharts of FIG. 7A and FIG. 7B are explained below using the example where the primary controller fails to operate normally.

A monitoring mechanism between the primary controller and the secondary controller is established through the RCC (7), allowing the secondary controller to monitor the operating status of the primary controller. According to one embodiment of the present invention, the monitoring mechanism is described as follows: the primary controller sends a confirmation signal to the secondary controller at a regular time interval of $\Delta T1$, allowing the secondary controller to verify the ongoing normal operation of the primary controller. In other words, if the secondary controller, after receiving a confirmation signal, does not receive another confirmation signal from the primary controller within the time interval of $\Delta T1$, then the secondary controller concludes that the primary controller is not operating properly and then begins preparations to take over the responsibilities of the primary controller.

According to another embodiment of the present invention, the monitoring mechanism is described as follows: the secondary controller sends a query signal to the primary controller at a regular time interval of $\Delta T2$ and waits for a response signal from the primary controller. If the secondary controller receives the response signal from the primary controller, the secondary controller confirms that the primary controller is still operating normally. During system operation, the secondary controller continuously repeats the aforesaid process to verify the normal operation of the primary controller. Conversely, if the secondary controller does not receive the response signal from the primary controller, the secondary controller concludes that the primary controller is not operating properly and then begins preparations to take over the responsibilities of the primary controller.

Please refer again to FIG. 7A. The following explanation applies to the RAID subsystems (4A, 4B, 4C) of the storage system architectures (2A, 2B, 2C) shown in FIG. 2, FIG. 3A, and FIG. 3B, where the SVC 1 (10) is configured as the primary controller, while the SVC 2 (20) is configured as the secondary controller. According to one embodiment of the present invention, when data flow switching is required (step 7001), for example, when the secondary controller (i.e., SVC 2 (20)) determines, based on the monitoring mechanism described above, that the primary controller (i.e., SVC 1 (10)) is not functioning normally, the secondary controller (i.e., SVC 2 (20)) sets itself as a new primary controller (step 7003). At this point, although the original primary controller (i.e., SVC 1 (10)) cannot provide services due to failure, the PSD (9) still continues receiving its dedicated clock signals uninterruptedly from its dedicated clock generation circuit (85). Therefore, the PSD (9) can continue to process I/O requests based on its dedicated clock signal, including executing previously received but unfinished I/O requests (step 7005)

Then, the new primary controller (i.e., SVC 2 (20)) issues a reset signal to the PSD controller (81) through its device-side I/O device interconnect controller (i.e., the device-side I/O device interconnect controller 2 (207)), requesting the PSD controller (81) to instruct its corresponding selector (83) to reset the user of the PSDs (9) to the new primary controller (i.e., SVC 2 (20)) (step 7007). The aforementioned configuration is achieved by establishing, through the selector (83), a communication path between the new primary controller (i.e., SVC 2) and the PSD (9). In this way, the data flow path between the new primary controller (i.e., SVC 2 (20)) and the PSD (9) is established accordingly (step 7009).

In one embodiment of the present invention, upon receiving the reset signal from the SVC 2 (20), the PSD controller (81) generates a selection signal and sends it to the associated selector (83), causing the selector (83) to select data and signals from the SVC 2 (20) based on the selection signal.

The following explanation takes the RAID subsystem (4A) of the storage system architecture (2A) in FIG. 2 as an example, assuming that the SVC 1 (10) is the primary controller. At time point T1, the SVC 1 (10) sends an input/output (I/O) request to the PSD 1 (9a) via the selector 1 (83a) in the data access interface unit 1 (8a), requesting to read a set of read data from the PSD 1 (9a). At time point T2, after receiving the I/O request, the PSD 1 (9a) prepares the read data requested by the (SVC 1) 10. At the subsequent time point T3, the SVC 1 (10) becomes unable to operate normally due to some issue, such as a failure, necessitating a switch in the data flow path to the SVC 2 (20), so that the SVC (2) 20 can provide service (step 7001). At time point T4, the SVC 2 (20) takes over the tasks of the SVC 1 (10) and becomes the primary controller (step 7003). At time point T5, the SVC 2 (20) notifies the PSD controller 1 (81a) in the data access interface unit 1 (8a) of setting up the SVC 2 (20) as its new user (step 7007). At time point T6, the PSD controller 1 (81a) knows that the primary controller is now the SVC 2 (20) and thus instructs the selector 1 (83a) to establish the communication path between the SVC 2 (20) and the PSD 1 (9a) (step 7009). In this example, from time point T3 to time point T6, the PSD 1 (9a) continues processing the related operations of the I/O request (step 7005), and finally, sends the prepared read data to the primary controller (i.e., the SVC 2 (20)), completing the I/O request operation.

Please refer again to FIG. 7B. The following explanation applies to the RAID subsystems (4A, 4B, 4C) of the storage system architectures (2A, 2B, 2C) shown in FIG. 2, FIG. 3A, and FIG. 3B, where the SVC 1 (10) is configured as the primary controller, while the SVC 2 (20) is configured as the secondary controller. According to one embodiment of the present invention, when data flow switching is required (step 7101), for example, when the secondary controller (i.e., SVC 2 (20)) determines, based on the monitoring mechanism described above, that the primary controller (i.e., SVC 1 (10)) is not functioning normally, the secondary controller (i.e., SVC 2 (20)) sets itself as a new primary controller (step 7103). At this point, according to another embodiment of the present invention, the RAID subsystems (4A, 4B, 4C) chooses to temporarily suspend the execution of pending I/O requests that have been received by the PSD (9) but have not yet been completed (step 7105).

Then, the new primary controller (i.e., SVC 2 (20)) issues a reset signal to the PSD controller (81) through its device-side I/O device interconnect controller 2 (207), requesting the PSD controller (81) to instruct its corresponding selector (83) to reset the user of the PSDs (9) to the new primary controller (i.e., SVC 2 (20)) (step 7107). The aforementioned configuration is achieved by establishing a communication path between the new primary controller (i.e., SVC 2 (20)) and the PSD (9) through the selector (85). In this way, the data flow path between the new primary controller (i.e., SVC 2 (20)) and the PSD (9) is established accordingly (step 7109). Afterwards, the PSDs (9) continues to receive the clock signal from its dedicated clock generation circuit (85), and processes one or more I/O requests from the new primary controller (i.e., SVC 2 (20)) based on its dedicated clock signal (step 7111).

The following explanation takes the RAID subsystem (4A) of the storage system architecture (2A) in FIG. 2 as an example, assuming that the SVC 1 (10) is the primary controller. At time point T1, the SVC 1 (10) sends an input/output (I/O) request to the PSD 1 (9a) via the selector 1 (83a) in the data access interface unit 1 (8a), requesting to read a set of read data from the PSD 1 (9a). At time point T2, after receiving the I/O request, the PSD 1 (9a) prepares the read data requested by the SVC 1 (10). Later at time point T3, the SVC 1 (10) becomes unable to operate normally due to some issue, such as a failure, necessitating a switch in the data flow path to the SVC 2 (20), so that the SVC 2 (20) can provide service (step 7101). At this time, the PSD 1 (9a) temporarily suspends the execution of the I/O request (step 7105). At time point T4, the SVC 2 (20) takes over the tasks of the SVC 1 (10) and becomes the primary controller (step 7103). At time point T5, the SVC 2 (20) notifies the PSD controller 1 (81a) in the data access interface unit 1 (8a) that the primary controller is now the SVC 2 (20) (step 7107). At time point T6, because the PSD controller 1 (81a) knows that the primary controller is now the SVC 2 (20), the PSD controller 1 (81a) instructs the selector 1 (83a) to establish the communication path between the SVC 2 (20) and the PSD 1 (9a) (step 7109). In this example, from time point T3 to time point T6, the PSD 1 (9a) suspends the execution of the I/O request originally requested by the SVC 1 (10). Later, at time point T7, the SVC 2 (20) issues a new I/O request to the PSD 1 (9a), requesting to read the set of read data again from the PSD 1 (9a) (step 7111).

In conclusion, according to the technology disclosed in the present invention, each of the PSDs (9) in the storage system architectures (2A, 2B, 2C) is equipped with an independently-operating and dedicated clock generation circuit that provides dedicated clock signals in a one-to-one manner (i.e., one PSD (9) is provided with one dedicated clock generation circuit). By employing the independently-operating and dedicated clock generation circuits to provide the dedicated clock signals to their associated PSDs (9) in a one-to-one manner, the present invention eliminates the need to rely on the SVCs (10, 20) for the provision of clock signals, and eliminates the use of additional circuit components (for example, the distributors (113, 115, 117)) to assist in routing clock signals from the SVCs (10, 20) to multiple coupled PSDs (9). Thus, the present invention not only resolves the issue in prior art where failure of the SVC resulted in the inability to provide clock signals, thus affecting the normal operation of coupled PSDs (9), but also resolves the issue in prior art where failure of distributors led to a lack of clock signals for multiple coupled PSDs (9), resulting in operational disruptions. Additionally, by eliminating the need for additional circuit components (such as distributors (113, 115, 117)), costs are reduced, and complex routing configurations are avoided While the preferred embodiments of the present invention have been disclosed as described above, it is not intended to limit the scope of the invention. Those skilled in the art may make minor modifications and variations without departing from the spirit of the present invention, and such modifications and variations are still within the scope of the present invention. Therefore, the scope of the present invention shall be determined by the claims attached to this specification, and not limited to the specific embodiments disclosed herein.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data access interface unit (8) coupled to a first storage virtualization controller (SVC 1) (10), a second storage virtualization controller (SVC 2) (20) and a physical storage device (PSD) (9) to assist either the first storage virtualization controller (SVC 1) (10) or the second storage virtualization controller (SVC 2) (20) in accessing the physical storage device (PSD) (9), the data access interface unit (8) comprising:

a physical storage device controller (PSD controller) (81) for receiving a first control signal from the first storage virtualization controller (SVC 1) (10) to confirm that the first storage virtualization controller (SVC 1) (10) is a primary controller of the physical storage device (PSD) (9), and generating a first selection signal, wherein when the physical storage device controller (PSD controller) (81) detects the physical storage device (PSD) (9) that is coupled, the physical storage device controller (PSD controller) (81) sends a notification signal to the first storage virtualization controller (SVC 1) (10) which acts as the primary controller to inform the first storage virtualization controller (SVC 1) (10) of availability of the physical storage device (PSD) (9);

a selector (83) for receiving the first selection signal to select data and signals from the first storage virtualization controller (SVC 1) (10) according to the first selection signal; and a clock generation circuit (85) for providing a dedicated clock signal to the physical storage device (PSD) (9);

wherein when the physical storage device controller (PSD controller) (81) receives a reset signal from the second storage virtualization controller (SVC 2) (20), the physical storage device controller (PSD controller) (81) initiates a data flow switching procedure to change the primary controller of the physical storage device (PSD) (9) from the first storage virtualization controller (SVC 1) (10) to the second storage virtualization controller (SVC 2) (20), and the data flow switching procedure includes generating a second selection signal to control the selector (83) to select data and signals from the second storage virtualization controller (SVC 2) (20).

2. The data access interface unit (8) of claim 1, wherein the data access interface unit (8) is installed on a backplane (401), and the data access interface unit (8) is coupled to the first storage virtualization controller (SVC 1) (10), the second storage virtualization controller (SVC 2) (20), and the physical storage device (PSD) (9) via the backplane (401).

3. The data access interface unit (8) of claim 1, wherein the physical storage device (PSD) (9) processes at least one input/output request (I/O request) from the first storage virtualization controller (SVC 1) (10) or the second storage virtualization controller (SVC 2) (20) based on the dedicated clock signal provided by the clock generation circuit (85).

4. The data access interface unit (8) of claim 3, wherein if the second storage virtualization controller (SVC 2) (20) does not receive a confirmation signal from the first storage virtualization controller (SVC 1) (10) within a first time interval, the second storage virtualization controller (SVC 2) (20) generates and sends the reset signal to the physical storage device controller (PSD controller) (81) to notify the physical storage device controller (PSD controller) (81) of setting up the second storage virtualization controller (SVC 2) (20) as the primary controller of the physical storage device (PSD) (9), and the physical storage device controller (PSD controller) (81) generates the second selection signal based on the reset signal to control the selector (83) to select data and signals from the second storage virtualization controller (SVC 2) (20).

5. The data access interface unit (8) of claim 3, wherein if the second storage virtualization controller (SVC 2) (20) does not receive a response signal from the first storage virtualization controller (SVC 1) (10) after sending a query signal to the first storage virtualization controller (SVC 1) (10), the second storage virtualization controller (SVC 2) (20) generates and sends the reset signal to the physical storage device controller (PSD controller) (81) to notify the physical storage device controller (PSD controller) (81) of setting up the second storage virtualization controller (SVC 2) (20) as the primary controller of the physical storage device (PSD) (9), and the physical storage device controller (PSD controller) (81) generates the second selection signal based on the reset signal to control the selector (83) to select data and signals from the second storage virtualization controller (SVC 2) (20).

6. The data access interface unit (8) of claim 3, wherein when the physical storage device controller (PSD controller) (81) performs the data flow switching procedure, the physical storage device (PSD) (9) continues executing the at least one I/O request from the first storage virtualization controller (SVC 1) (10) based on the dedicated clock signal provided by the clock generation circuit (85).

7. The data access interface unit (8) of claim 3, wherein when the physical storage device controller (PSD controller) (81) performs the data flow switching procedure, the physical storage device (PSD) (9) temporarily suspends the execution of the at least one I/O request from the first storage virtualization controller (SVC 1) (10).

8. The data access interface unit (8) of claim 1, wherein the clock generation circuit (85) provides the dedicated clock signal to the physical storage device (PSD) (9) in a one-to-one manner.

9. The data access interface unit (8) of claim 1, wherein the first storage virtualization controller (SVC 1) (10) and the second storage virtualization controller (SVC 2) (20) do not require additional circuit components to assist in directing their clock signals to the physical storage device (PSD) (9).

10. A data access method implemented to a redundant array of independent disks subsystem (RAID subsystem) (4A, 4B, 4C), where the RAID subsystem (4A, 4B, 4C) comprises a storage virtualization controller pair (SVC pair) (10, 20), a physical storage device (PSD) (9), and a data access interface unit (8) serving as an intermediary between the storage virtualization controller pair (SVC pair) (10, 20) and the physical storage device (PSD) (9), in which the data access interface unit (8) comprises a physical storage device controller (PSD controller) (81), a selector (83), and a clock generation circuit (85), and the storage virtualization controller pair (SVC pair) (10, 20) comprises a first storage virtualization controller (SVC 1) (10) and a second storage virtualization controller (SVC 2) (20), the data access method comprising steps of:

coupling the data access interface unit (8) between the storage virtualization controller pair (SVC pair) (10, 20) and the physical storage device (PSD) (9);

sending, by the physical storage device controller (PSD controller) (81), a notification signal to the first storage virtualization controller (SVC 1) (10) acting as a primary controller, to notify the first storage virtualization controller (SVC 1) (10) that the physical storage device (PSD) (9) is available for use, after detecting the coupling with the physical storage device (PSD) (9);

receiving, by the physical storage device controller (PSD controller) (81), a first control signal from the first storage virtualization controller (SVC 1) (10), generating a first selection signal accordingly, and sending it to the selector (83);

receiving, by the selector (83), the first selection signal and, based on the first selection signal, routing data and signals along a path between the first storage virtualization controller (SVC 1) (10) and the physical storage device (PSD) (9), so that the first storage virtualization controller (SVC 1) (10) acts as the primary controller for the physical storage device (PSD) (9);

providing, by the clock generation circuit (85), a dedicated clock signal to the physical storage device (PSD) (9); and processing, by the physical storage device (PSD) (9), at least one input/output (I/O) request from the first storage virtualization controller (SVC 1) (10) based on the dedicated clock signal provided by the clock generation circuit (85);

receiving, by the physical storage device controller (PSD controller) (81), a reset signal from the second storage virtualization controller (SVC 2) (20), and based on the reset signal, the physical storage device controller (PSD controller) (81) initiates a data flow switching procedure to change the primary controller of the physical storage device (PSD) (9) from the first storage virtualization controller (SVC 1) (10) to the second storage virtualization controller (SVC 2) (20), and the data flow switching procedure includes generating a second selection signal to control the selector (83) to route data and signals along a path between the second storage virtualization controller (SVC 2) (20) and the physical storage device (PSD) (9).

11. The data access method of claim 10, wherein the data access interface unit (8) is installed on a backplane (401), and the data access interface unit (8) is coupled to the storage virtualization controller pair (SVC pair) (10, 20) and the physical storage device (PSD) (9) via the backplane (401).

12. The data access method of claim 10, wherein if the second storage virtualization controller (SVC 2) (20) does not receive a confirmation signal from the first storage virtualization controller (SVC 1) (10) within a first time interval, the second storage virtualization controller (SVC 2) (20) generates and sends the reset signal to the physical storage device controller (PSD controller) (81) to notify the physical storage device controller (PSD controller) (81) of setting up the second storage virtualization controller (SVC 2) (20) as the primary controller of the physical storage device (PSD) (9), and the physical storage device controller (PSD controller) (81) generates the second selection signal based on the reset signal to control the selector (83) to select data and signals from the second storage virtualization controller (SVC 2) (20).

13. The data access method of claim 10, wherein if the second storage virtualization controller (SVC 2) (20) does not receive a response signal from the first storage virtualization controller (SVC 1) (10) after sending a query signal to the first storage virtualization controller (SVC 1) (10), the second storage virtualization controller (20) generates and sends the reset signal to the physical storage device controller (PSD controller) (81) to notify the physical storage device controller (PSD controller) (81) of setting up the second storage virtualization controller (SVC 2) (20) as the primary controller of the physical storage device (PSD) (9), and the physical storage device controller (PSD controller) (81) generates the second selection signal based on the reset signal to control the selector (83) to select data and signals from the second storage virtualization controller (SVC 2) (20).

14. The data access method of claim 10, wherein when the physical storage device controller (PSD controller) (81) performs the data flow switching procedure, the physical storage device (PSD) (9) continues executing the at least one I/O request from the first storage virtualization controller (SVC 1) (10) based on the dedicated clock signal provided by the clock generation circuit (85).

15. The data access method of claim 10, wherein when the physical storage device controller (PSD controller) (81) performs the data flow switching procedure, the physical storage device (PSD) (9) temporarily suspends the execution of the at least one I/O request from the first storage virtualization controller (SVC 1) (10).

16. The data access method of claim 10, wherein the clock generation circuit (85) provides the dedicated clock signal to the physical storage device (PSD) (9) in a one-to-one manner.

17. The data access method of claim 10, wherein the first storage virtualization controller (SVC 1) (10) and the second storage virtualization controller (SVC 2) (20) do not require additional circuit components to assist in directing their clock signals to the physical storage device (PSD) (9).

18. A data access method implemented to a redundant array of independent disks subsystem (RAID subsystem) (4A, 4B, 4C), where the RAID subsystem (4A, 4B, 4C) comprises a storage virtualization controller pair (SVC pair) (10, 20), a physical storage device (PSD) (9), and a data access interface unit (8) serving as an intermediary between the storage virtualization controller pair (SVC pair) (10, 20) and the physical storage device (PSD) (9), in which the data access interface unit (8) comprises a physical storage device controller (PSD controller) (81), a selector (83), and a clock generation circuit (85), and the storage virtualization controller pair (SVC pair) (10, 20) comprises a first storage virtualization controller (SVC 1) (10) and a second storage virtualization controller (SVC 2) (20), the data access method comprising steps of:

coupling the data access interface unit (8) between the storage virtualization controller pair (SVC pair) (10, 20) and the physical storage device (PSD) (9);

setting up the first storage virtualization controller (SVC 1) (10) as a primary controller of the physical storage device (PSD) (9);

processing, by the physical storage device (PSD) (9), at least one first input/output (I/O) request from the first storage virtualization controller (SVC 1) (10) based on a dedicated clock signal provided by the clock generation circuit (85);

sending, by the second storage virtualization controller (SVC 2) (20), a reset signal to the physical storage device controller (PSD controller) (81) of the data access interface unit (8), to set up the second storage virtualization controller (SVC 2) (20) as the primary controller of the physical storage device (PSD) (9);

generating, by the physical storage device controller (PSD controller) (81), a selection signal based on the reset signal and sending the selection signal to the selector (83) to control the selector (83) to route data and signals along a path between the second storage virtualization controller (SVC 2) (20) and the physical storage device (PSD) (9) according to the selection signal; and processing, by the physical storage device (PSD) (9), at least one second input/output (I/O) request from the second storage virtualization controller (SVC 2) (20) based on the dedicated clock signal provided by the clock generation circuit (85);

wherein, during a process of switching the primary controller of the physical storage device (PSD) (9) from the first storage virtualization controller (SVC 1) (10) to the second storage virtualization controller (SVC 2) (20), the physical storage device (PSD) (9) processes the at least one first input/output (I/O) request according to the dedicated clock signal provided by the clock generation circuit (85).

19. The data access method of claim 18, wherein the data access interface unit (8) is installed on a backplane (401), and the data access interface unit (8) is coupled to the storage virtualization controller pair (SVC pair) (10, 20) and the physical storage device (PSD) (9) via the backplane (401).

20. The data access method of claim 18, wherein the step of sending, by the second storage virtualization controller (SVC 2) (20), the reset signal to the physical storage device controller (PSD controller) (81) of the data access interface unit (8) further comprises:

generating and sending the reset signal to the physical storage device controller (PSD controller) (81) by the second storage virtualization controller (SVC 2) (20) when the second storage virtualization controller (SVC 2) (20) does not receive a confirmation signal from the first storage virtualization controller (SVC 1) (10) after a first time interval.

21. The data access method of claim 18, wherein the step of sending, by the second storage virtualization controller (SVC 2) (20), the reset signal to the physical storage device controller (PSD controller) (81) in the data access interface unit (8) further comprises:

generating and sending the reset signal to the physical storage device controller (PSD controller) (81) by the second storage virtualization controller (SVC 2) (20) when the second storage virtualization controller (SVC 2) (20) does not receive a response signal from the first storage virtualization controller (SVC 1) (10) after sending a query signal to the first storage virtualization controller (SVC 1) (10).

22. The data access method of claim 18, wherein the clock generation circuit (85) provides the dedicated clock signal to the physical storage device (PSD) (9) in a one-to-one manner.

23. The data access method of claim 18, wherein the first storage virtualization controller (SVC 1) (10) and the second storage virtualization controller (SVC 2) (20) do not require additional circuit components to assist in directing their clock signals to the physical storage device (PSD) (9).

* * * * *